US012804362B2

(12) United States Patent
Cho et al.

(10) Patent No.: US 12,804,362 B2
(45) Date of Patent: Nov. 17, 2026

(54) ELECTRONIC DEVICE FOR PERFORMING WIRELESS COMMUNICATION AND OPERATION METHOD THEREOF

(71) Applicant: Samsung Electronics Co., Ltd., Suwon-si (KR)

(72) Inventors: Seunghwa Cho, Suwon-si (KR); Dongnyeong Kim, Suwon-si (KR); Jongjin Bae, Suwon-si (KR); Aleum Jeong, Suwon-si (KR); Seungdong You, Suwon-si (KR); Heejoong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 18/471,737

(22) Filed: Sep. 21, 2023

(65) Prior Publication Data

US 2024/0179498 A1 May 30, 2024

Related U.S. Application Data

(63) Continuation of application No. PCT/KR2023/013931, filed on Sep. 15, 2023.

(30) Foreign Application Priority Data

Nov. 29, 2022 (KR) ........................ 10-2022-0162414
Dec. 13, 2022 (KR) ........................ 10-2022-0173848

(51) Int. Cl.
*H04W 4/16* (2009.01)
*H04W 76/12* (2018.01)

(52) U.S. Cl.
CPC ............ *H04W 4/16* (2013.01); *H04W 76/12* (2018.02)

(58) Field of Classification Search
CPC .... H04W 4/16; H04W 60/06; H04L 65/1016; G06F 9/4856
See application file for complete search history.

(56) References Cited

U.S. PATENT DOCUMENTS 7,809,842 B2 10/2010 Moran et al.
8,705,722 B2 4/2014 Boni et al.
(Continued)

FOREIGN PATENT DOCUMENTS

JP 2000-224336 A 8/2000
JP 4165298 B2 10/2008
(Continued)

OTHER PUBLICATIONS

International Search Report dated Dec. 14, 2023, issued in International Application No. PCT/KR2023/013931.
(Continued)

*Primary Examiner* — Jinsong Hu
*Assistant Examiner* — Justin Barry
(74) *Attorney, Agent, or Firm* — Jefferson IP Law, LLP

(57) ABSTRACT

An electronic device and a method for performing wireless communication by an electronic device are provided. The electronic device includes a communication circuit and a processor configured to establish, via a server, a call connection with a first external electronic device, transmit or receive, to or from the first external electronic device via direct communication with the first external electronic device, data related to an application program, based on an occurrence of an event related to a transferring of the call connection from the first external electronic device to a second external electronic device, store state information on the application program, transmit, to the second external electronic device via direct communication with the second external electronic device, the state information on the (Continued)

application program, and transmit, to the server, information on the transferring of the call connection from the first external electronic device to the second external electronic device.

12 Claims, 12 Drawing Sheets

(56) References Cited

U.S. PATENT DOCUMENTS

| | | | |
|---|---|---|---|
| 9,648,049 B2 | 5/2017 | Gangadharan et al. | |
| 9,668,166 B2 | 5/2017 | Santhanam et al. | |
| 10,225,817 B2 | 3/2019 | Oyman | |
| 11,190,598 B2 | 11/2021 | Hassler | |
| 12,335,439 B1 * | 6/2025 | Taylor | H04M 3/42059 |
| 2004/0243715 A1 | 12/2004 | Yokoyama | |
| 2010/0157882 A1 | 6/2010 | Moriwaki et al. | |
| 2012/0290669 A1 | 11/2012 | Parks et al. | |
| 2015/0163295 A1 * | 6/2015 | Shmilov | H04L 67/104 370/271 |
| 2015/0188882 A1 | 7/2015 | Wang et al. | |
| 2015/0200946 A1 | 7/2015 | Horn et al. | |
| 2015/0264106 A1 | 9/2015 | Baek et al. | |
| 2015/0271340 A1 | 9/2015 | Yu et al. | |
| 2015/0350857 A1 | 12/2015 | Lim et al. | |
| 2015/0382251 A1 * | 12/2015 | Wang | H04W 56/001 455/439 |
| 2016/0142467 A1 | 5/2016 | Ban et al. | |
| 2016/0149836 A1 * | 5/2016 | Narayanan | H04L 65/1033 709/206 |
| 2016/0315938 A1 | 10/2016 | Kunz et al. | |
| 2017/0244837 A1 | 8/2017 | Kim et al. | |
| 2023/0138804 A1 * | 5/2023 | Mao | G06F 3/1454 348/14.03 |

FOREIGN PATENT DOCUMENTS

| | | | |
|---|---|---|---|
| JP | 4370356 | B2 | 11/2009 |
| JP | 6330916 | B2 | 5/2018 |
| JP | 6414630 | B2 | 10/2018 |
| KR | 10-2003-0042838 | A | 6/2003 |
| KR | 10-0687266 | B1 | 2/2007 |
| KR | 10-0747704 | B1 | 8/2007 |
| KR | 10-2015-0073470 | A | 7/2015 |
| KR | 10-2015-0110263 | A | 10/2015 |
| KR | 10-2015-0137328 | A | 12/2015 |
| KR | 10-1599282 | B1 | 3/2016 |
| KR | 10-2016-0057873 | A | 5/2016 |
| KR | 10-1727494 | B1 | 4/2017 |
| KR | 10-1891639 | B1 | 8/2018 |
| KR | 10-2041492 | B1 | 11/2019 |
| KR | 10-2063460 | B1 | 1/2020 |
| KR | 10-2172468 | B1 | 10/2020 |
| KR | 10-2333138 | B1 | 11/2021 |

OTHER PUBLICATIONS

European Search Report dated Nov. 13, 2025, issued in European Application No. 23898018.9.

* cited by examiner

ELECTRONIC DEVICE FOR PERFORMING WIRELESS COMMUNICATION AND OPERATION METHOD THEREOF

CROSS-REFERENCE TO RELATED APPLICATION(S)

This application is a continuation application, claiming priority under § 365(c), of an International application No. PCT/KR2023/013931, filed on Sep. 15, 2023, which is based on and claims the benefit of a Korean patent application number 10-2022-0162414, filed on Nov. 29, 2022, in the Korean Intellectual Property Office, and of a Korean patent application number 10-2022-0173848, filed on Dec. 13, 2022, in the Korean Intellectual Property Office, the disclosure of each of which is incorporated by reference herein in its entirety.

TECHNICAL FIELD

The disclosure relates to an electronic device for performing wireless communication and an operation method thereof.

BACKGROUND ART

A wireless communication system may provide wireless communication of an electronic device in order to ensure mobility (or activity) of a user having the electronic device. For example, wireless communication may include a communication technology in which a transmission device and a reception device transmit and/or receive signals (or data) via radio resources (e.g., frequency and/or time). A wireless communication system is expanding its scope to a data service as well as a voice service.

A wireless communication system may provide an interactive calling function using a voice service and a data service. The interactive calling may include a function of sharing information on an application program within a call (e.g., a voice call or a video call) between electronic devices.

The above information is presented as background information only to assist with an understanding of the disclosure. No determination has been made, and no assertion is made, as to whether any of the above might be applicable as prior art with regard to the disclosure.

DISCLOSURE

Technical Problem

When an interactive calling function is provided, an electronic device may acquire an application program, which is for connecting a call or is shared with a first external electronic device connected via a call, from an external server via a first Internet protocol (IP) multimedia subsystem (IMS) data channel. The electronic device may transmit and/or receive information (or data) on the application program to and/or from the first external electronic device via a second IMS data channel with respect to an external electronic device during the call associated with the first external electronic device.

The electronic device needs a method for, when the call connection with the first external electronic device is transferred to a second external electronic device (e.g., an electronic device of the same user) in a multi device experience (MDE) environment, or when the call connection with the first external electronic device is transferred (e.g., call transfer) to a second external electronic device (e.g., an electronic device of another user), providing information on the application program shared with the first external electronic device to the second external electronic device.

Aspects of the disclosure are to address at least the above-mentioned problems and/or disadvantages and to provide at least the advantages described below. Accordingly, an aspect of the disclosure is to provide a device and a method for, when an electronic device transfers a call associated with a first external electronic device to a second external electronic device, providing information on an application program shared with the first external electronic device to the second external electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit and a processor operatively connected to the communication circuit. According to an embodiment, the processor establishes a call connection with a first external electronic device via a server through the communication circuit. According to an embodiment, the processor at least one of transmits or receives, to or from the first external electronic device via direct communication with the first external electronic device, data related to an application program. According to an embodiment, the processor, based on an occurrence of an event related to a transferring of the call connection from the first external electronic device to a second external electronic device, stores state information on the application program. According to an embodiment, the processor transmits, to the second external electronic device via direct communication with the second external electronic device, the state information on the application program. According to an embodiment, the processor transmits, to the server, information on the transferring of the call connection from the first external electronic device to the second external electronic device.

In accordance with another aspect of the disclosure, an operation method of an electronic device is provided. The operation method includes establishing, via a server, a call connection with a first external electronic device. According to an embodiment, the operation method of the electronic device includes at least one of transmitting or receiving, to or from the first external electronic device via direct communication with the first external electronic device, data related to an application program. According to an embodiment, the operation method of the electronic device includes, based on an occurrence of an event related to a transferring of the call connection from the first external electronic device to a second external electronic device, storing state information on the application program. According to an embodiment, the operation method of the electronic device includes transmitting, to the second external electronic device via direct communication with the second external electronic device, the state information on the application program. According to an embodiment, the operation method of the electronic device includes transmitting, to the server, information on the transferring of the call connection from the first external electronic device to the second external electronic device.

In accordance with another aspect of the disclosure, a non-transitory computer-readable storage medium (or computer program product) storing one or more programs is provided. The one or more programs include instructions which, when executed by a processor of an electronic device, cause the electronic device to establish, via a server, a call connection with a first external electronic device, at least one of transmit or receive, to or from the first external electronic device via direct communication with the first external electronic device, data related to an application program, based on an occurrence of an event related to a transferring of the call connection from the first external electronic device to a second external electronic device, store state information on the application program, transmit, to the second external electronic device via direct communication with the second external electronic device, the state information on the application program, and transmit, to the server, information on the transferring of the call connection from the first external electronic device to the second external electronic device.

According to various embodiments of the disclosure, when an electronic device transfers a call associated with a first external electronic device to a second external electronic device, users of the first external electronic device and the second external electronic device can continuously use an application program shared with the first external electronic device, by providing information on the application program to the second external electronic device via direct communication (e.g., peer-to-peer (P2P)).

The effects obtainable in various embodiments of the disclosure are not limited to the aforementioned effects, and other effects that are not mentioned may be clearly understood by those skilled in the art to which the various embodiments of the disclosure belong, from descriptions below.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
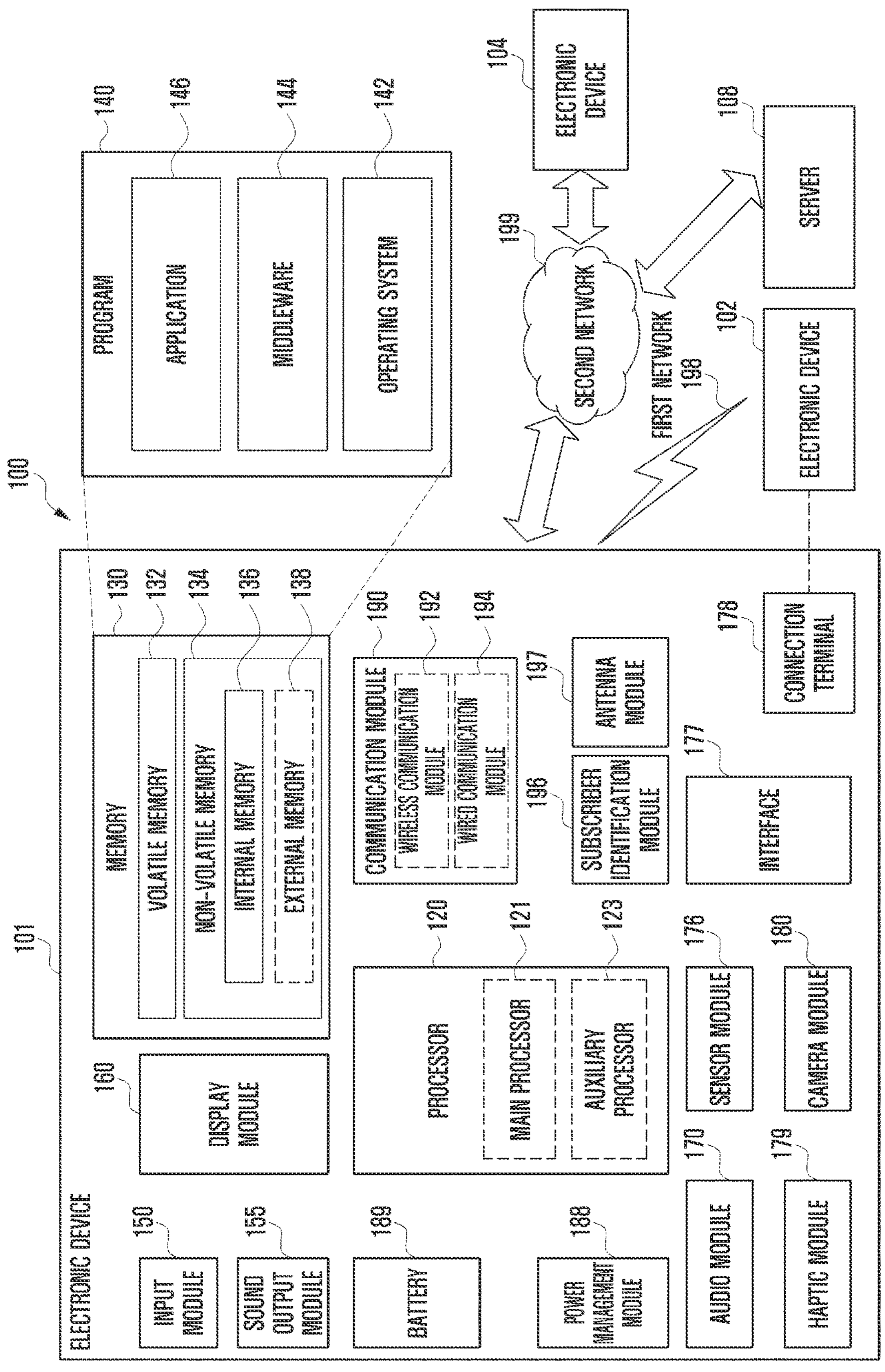
FIG. 1 is a block diagram of an electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server

108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic device 102 or 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
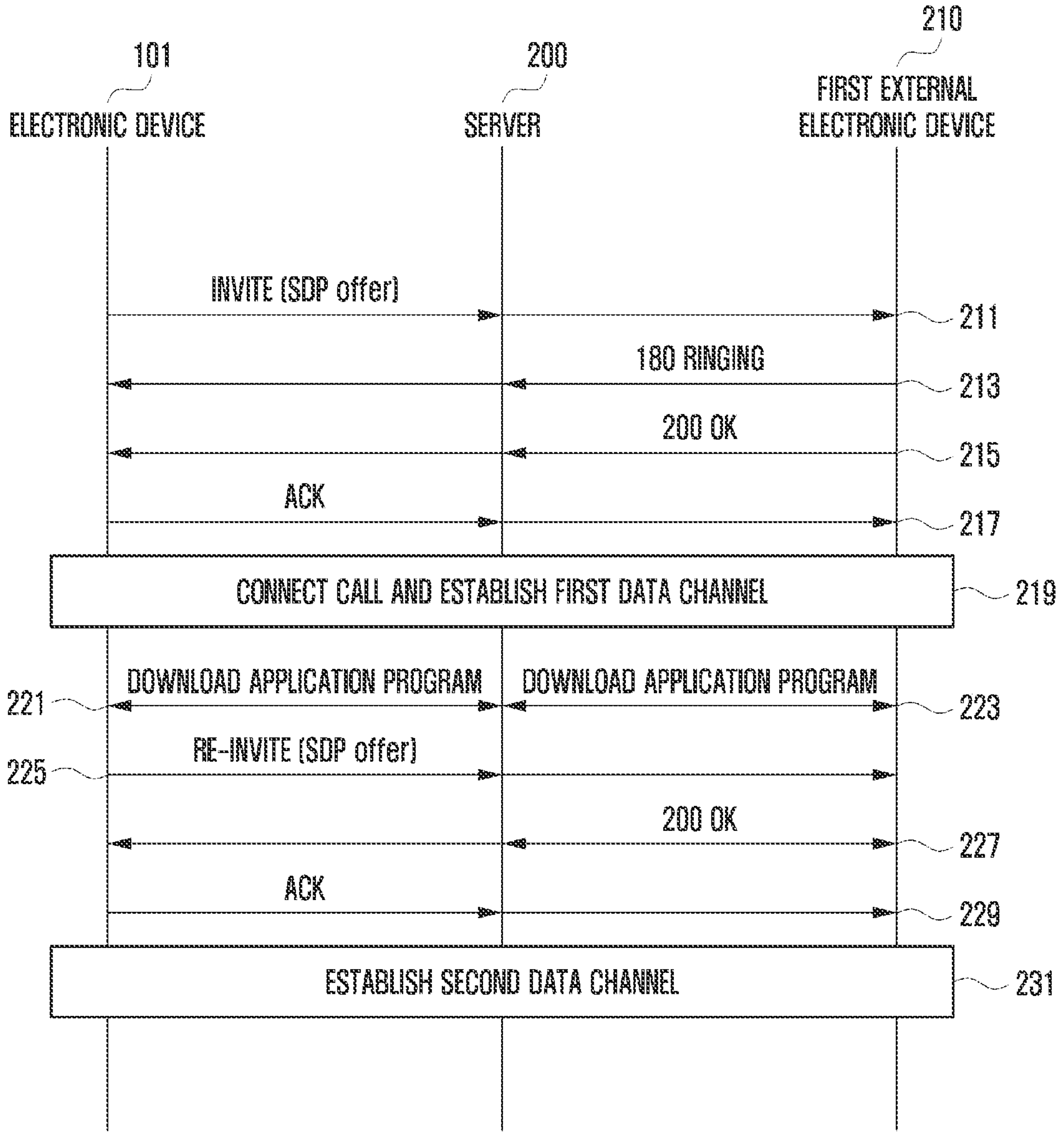
FIG. 2 is an example for providing an interactive calling function associated with a first external electronic device in an electronic device according to an embodiment of the disclosure.

FIG. 2 is an example for providing an interactive calling function associated with a first external electronic device in an electronic device according to an embodiment of the disclosure.

Referring to FIG. 2, in operation 211, when occurrence of a call connection event related to a first external electronic device 210 is sensed (or detected), the electronic device 101 may transmit, to the first external electronic device 210 via a server 200, a request signal (e.g., an invite message) related to a call connection. For example, the server 200 may include an IMS server supporting an Internet protocol (IP) multimedia subsystem (IMS) function. For example, the request signal (e.g., the invite message) related to the call connection may include information (e.g., m=application) related to an interactive calling function associated with the first external electronic device 210 in the form of a session description protocol (SDP) (e.g., an SDP offer). For example, the call connection event may occur based on at least one of execution of an application program or function related to the call, an input related to the call connection, reception of a signal related to the call connection, or acquisition of motion information on the call connection.

According to various embodiments, in operation 213, the first external electronic device 210 may transmit information (e.g., 180 ringing) related to a ring back tone to the electronic device 101 via the server 200, based on reception of the request signal related to the call connection. For example, the ring back tone may indicate a ring tone played back until the first external electronic device 210 accepts or rejects the call connection with the electronic device 101.

According to various embodiments, in operation 215, the first external electronic device 210 may transmit, to the electronic device 101 via the server 200, information (e.g., 200 OK) on acceptance of the call connection, based on the acceptance of the call connection with the electronic device 101.

According to various embodiments, in operation 217, the electronic device 101 may transmit, to the first external electronic device 210 via the server 200, a response signal (e.g., acknowledgment (ACK)) for the information on the acceptance of the call connection received from the first external electronic device 210.

According to various embodiments, in operation 219, for the electronic device 101 and the first external electronic device 210, a call may be connected based on the response signal and the information on the acceptance of the call connection, and a first data channel with respect to the server 200 may be established. For example, the first data channel may include an IMS data channel established for the electronic device 101 and the first external electronic device 210 with respect to the server 200. As an example, the call connection of the electronic device 101 and the first external electronic device 210 may include a call connection (e.g., voice over long-term evolution (VoLTE) or voice over new radio (VoNR)) based on a long-term evolution (LTE) communication scheme or a new radio (NR) communication scheme.

According to various embodiments, in operations 221 and 223, the electronic device 101 and/or the first external electronic device 210 may download (or acquire) an application program from the server 200 via the first data channel in a state where the call is connected. According to an embodiment, the electronic device 101 and/or the first external electronic device 210 may download (or acquire) a menu related to the interactive calling function from the server 200 via the first data channel in a state where the call is connected. The electronic device 101 and/or the first external electronic device 210 may output (or display) the menu related to the interactive calling function. The electronic device 101 and/or the first external electronic device 210 may transmit, to the server 200, identification information on the application program selected based on a menu-related input (or user input). The electronic device 101 and/or the first external electronic device 210 may download (or acquire), from the server 200, the application program selected from the menu.

According to an embodiment, the electronic device 101 and/or the first external electronic device 210 may download (or acquire) the application program related to the electronic device 101 and/or the first external electronic device 210 from the server 200 via the first data channel, based on the call connection. For example, the application program related to the electronic device 101 and/or the first external electronic device 210 may be selected based on the information on the call connection or the identification information of the electronic device 101 and/or the first external electronic device 210.

According to an embodiment, the electronic device 101 and/or the first external electronic device 210 may download the application program from the server 200, based on a real-time communication (RTC) function (e.g., WebRTC). For example, the application program may be driven in the electronic device 101 and/or the first external electronic device 210 via a web browser (or a web page or a web view) regardless of an operating system (OS) of the electronic device 101 and/or the first external electronic device 210, without being installed in the electronic device 101 and/or the first external electronic device 210. For example, the application program may be configured based on a hypertext markup language (HTML) or Java script.

According to various embodiments, in operation 225, the electronic device 101 may transmit information (e.g., a re-invite message) related to establishment of a data channel related to the application program to the first external electronic device 210 via the server 200. For example, the information on establishment of the data channel related to the application program may include information necessary for establishment of the data channel between the electronic device 101 and the first external electronic device 210 in the form of an SDP (e.g., SDP offer).

According to various embodiments, in operation 227, the first external electronic device 210 may transmit, to the electronic device 101 via the server 200, information (e.g., 200 OK) on acceptance of establishment of the data channel related to the application program with respect to the electronic device 101.

According to various embodiments, in operation 229, the electronic device 101 may transmit, to the first external electronic device 210 via the server 200, a response signal (e.g., ACK) for the information on the acceptance of establishment of the data channel, which is received from the first external electronic device 210.

According to various embodiments, in operation 231, for the electronic device 101 and the first external electronic device 210, a second data channel may be established based on the response signal and the information on the acceptance of the data channel. The electronic device 101 and the first external electronic device 210 may transmit and/or receive information (or data) on the application program via the second data channel. For example, the second data channel may include an IMS data channel established for direct communication (e.g., P2P) between the electronic device 101 and the first external electronic device 210. For example, the information (or data) on the application program may include a control signal for driving the application program.

According to various embodiments, the electronic device 101 and the first external electronic device 210 may establish a data channel for sharing the application program in a state where the call is connected. According to an embodiment, the electronic device 101 may transmit a request signal related to sharing of the application program from the first external electronic device 210 via the server 200, based on occurrence of an event related to sharing of the application program in a state where the call is connected to the first external electronic device 210. The electronic device 101 and/or the first external electronic device 210 may download (or acquire) the application program via the first data channel with respect to the server 200, which is established based on the request signal related to sharing of the application program. The electronic device 101 and/or the first external electronic device 210 may establish the second data channel related to the application program via the server 200. The electronic device 101 and the first external electronic device 210 may transmit and/or receive information (or data) on the application program via the second data channel. For example, sharing of the application program may include a series of operations in which the electronic device 101 and the first external electronic device 210 execute one application program together.

Figure 3:
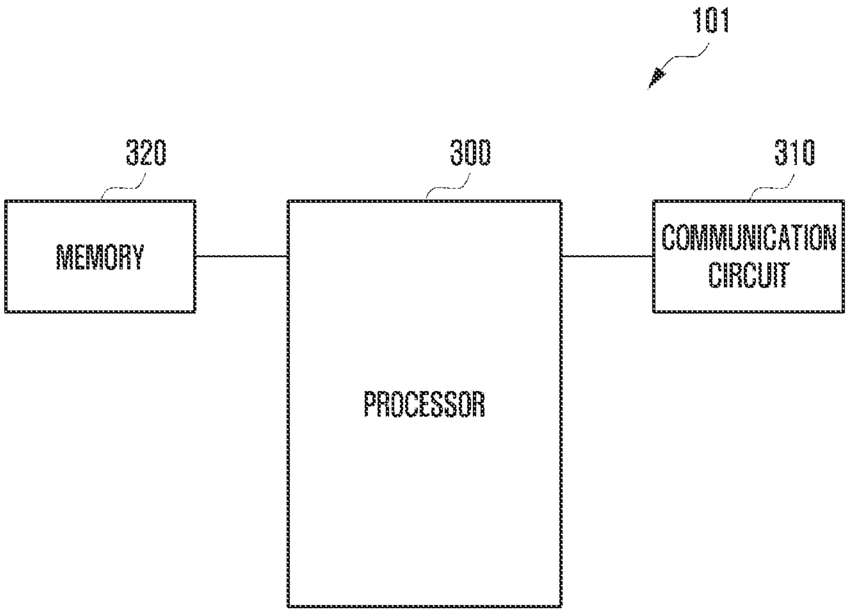
FIG. 3 is a block diagram of an electronic device for providing an interactive calling function according to an embodiment of the disclosure.

FIG. 3 is a block diagram of the electronic device for providing the interactive calling function according to an embodiment of the disclosure. According to an embodiment, the electronic device 101 of FIG. 3 may be at least partially similar to the electronic device 101 of FIG. 1 or 2, or may further include other embodiments of the electronic device.

Referring to FIG. 3, according to various embodiments, the electronic device 101 may include a processor 300 (e.g., including processing circuitry), a communication circuit 310, and/or a memory 320. According to an embodiment, the processor 300 may be substantially the same as the processor 120 of FIG. 1 or may be included in the processor 120. The communication circuit 310 may be substantially the same as the wireless communication module 192 of FIG. 1 or may be included in the wireless communication module 192. The memory 320 may be substantially the same as the memory 130 of FIG. 1 or may be included in the memory 130.

According to various embodiments, the processor 300 may control the communication circuit 310 and/or the memory 320 which are operatively, functionally, and/or electrically connected. According to an embodiment, the processor 300 may include an application processor (AP) (e.g., the main processor 121 of FIG. 1) and/or a communication processor (CP) (e.g., the auxiliary processor 123 of FIG. 1 or the communication module 190).

According to various embodiments, the processor 300 may control the communication circuit 310 to establish a data channel and a call connection with the first external electronic device 210. According to an embodiment, when occurrence of a call connection event related to the first external electronic device 210 is sensed (or detected), the processor 300 may connect a call to the first external electronic device 210 via the server 200 (e.g., an IMS server) and control (e.g., operations 211 to 219 of FIG. 2) the communication circuit 310 to establish a data channel (e.g., the first data channel of FIG. 2) associated with the server 200. The processor 300 may download (e.g., operation 221 of FIG. 2) an application program to be shared with the first external electronic device 210 from the server 200, based on establishment of the data channel with respect to the server 200. The processor 300 may control (e.g., operations 225 to 231 of FIG. 2) the communication circuit 310 to establish a data channel (e.g., the second data channel of FIG. 2) related to the application program.

According to an embodiment, when occurrence of a call connection event related to the first external electronic device 210 is sensed, the processor 300 may control the communication circuit 310 to connect a call to the first external electronic device 210 via the server 200 (e.g., the IMS server). When occurrence of an event related to sharing of the application program is sensed in a state where the call is connected to the first external electronic device 210, the processor 300 may control the communication circuit 310 to establish a data channel for sharing of the application program with the first external electronic device 210.

According to an embodiment, in a state where the call is connected between the electronic device 101 and the first external electronic device 210, the processor 300 may control the communication circuit 310 to transmit and/or receive information (or data) on the application program via the second data channel with respect to the first external electronic device 210.

According to various embodiments, when occurrence of a call transfer event is sensed (or detected), the processor 300 may store state information on the application program which is being shared with the first external electronic device 210. According to an embodiment, when the occurrence of the call transfer event is sensed (or detected), the processor 300 may store the state information on the application program via a first control command (e.g., savestate( ) application programming interface (API)) related to the application program. For example, the state information on the application program may be stored in the form of <key, value> based on identification information (e.g., a phone number) of the first external electronic device 210 connected to the electronic device 101 via the call. As an example, the key may represent the identification information (e.g., a phone number) of the first external electronic device 210. As an example, the value may represent information on a current state (or current driving state) of the application program. As an example, the call transfer event may occur based on at least one of an input related to a call transfer, reception of a signal related to a call transfer, or acquisition of motion information related to a call transfer.

According to various embodiments, the processor 300 may control the communication circuit 310 to transmit the state information on the application program, which is being shared with the first external electronic device 210, to a second external electronic device to which the call connection with the first external electronic device 210 is to be transferred. According to an embodiment, the processor 300 may control the communication circuit 310 to establish a data channel between the electronic device 101 and the second external electronic device. The processor 300 may control the communication circuit 310 to transmit the state information on the application program to the second external electronic device via the data channel with respect to the second external electronic device. For example, the second external electronic device may include an external electronic device in which the call connection with the electronic device 101 is in a holding call state. For example, the holding call state may include a state in which the call between the electronic device 101 and the second external electronic device has been connected, but an input and an output of call-related information (e.g., voice and/or video) are limited in the electronic device 101 and/or the second external electronic device.

According to various embodiments, the processor 300 may control the communication circuit 310 so that the call connection with the first external electronic device 210 is transferred to the second external electronic device. According to an embodiment, the processor 300 may control the communication circuit 310 to transmit, to the server 200, information on the call transfer to the second external electronic device. The processor 300 may control the communication circuit 310 to release the call connection between the electronic device 101 and the first external electronic device 210 and/or release the call connection between the electronic device 101 and the second external electronic device.

According to an embodiment, the second external electronic device (e.g., the processor 300) may connect a call to the first external electronic device 210, based on reception of a request signal related to the call transfer from the server 200. The second external electronic device (e.g., the processor 300) may download, from the server 200, the application program shared by the electronic device 101 and the first external electronic device 210. The second external electronic device (e.g., the processor 300) may restore state information on the application program being shared with the first external electronic device 210, which is acquired from the electronic device 101. The second external electronic device (e.g., the processor 300) may transmit and/or receive information on the application program via the data channel with respect to the first external electronic device 210. For example, the restoring of the state information on the application program may include a series of operations for restoring a driving state of the application program shared by the electronic device 101 and the first external electronic device 210.

According to various embodiments, when occurrence of the call transfer event is sensed (or detected), the processor 300 may store state information on the application program which is being shared with the first external electronic device 210. For example, the state information on the application program may be stored in the form of <key, value> based on identification information (e.g., a phone number) of the first external electronic device 210 connected to the electronic device 101 via the call.

According to various embodiments, the processor 300 may control the communication circuit 310 to transmit the state information on the application program, which is being shared with the first external electronic device 210, to a second external electronic device to which the call connection with the first external electronic device 210 is to be transferred. According to an embodiment, the processor 300 may control the communication circuit 310 to establish the data channel between the electronic device 101 and the second external electronic device. The processor 300 may control the communication circuit 310 to transmit the application program, the state information on the application program, and state information of the electronic device 101 to the second external electronic device via the data channel with respect to the second external electronic device. For example, the second external electronic device may include at least one external electronic device in association with which the electronic device 101 is able to establish a data channel. For example, the state information of the electronic device 101 may include information on a resolution of a touch area of the electronic device 101.

According to various embodiments, the processor 300 may control the communication circuit 310 to transmit and/or receive call information associated with the first external electronic device 210 to and/or from the second external electronic device via the data channel with respect to the second external electronic device. According to an embodiment, the processor 300 may control the communication circuit 310 to transmit, to the second external electronic device, the call information (e.g., voice and/or video) received from the first external electronic device 210 by the electronic device 101. The processor 300 may control the communication circuit 310 to transmit, to the first external electronic device 210, the call information (e.g., voice and/or video) received from the second external electronic device. For example, the processor 300 may control the communication circuit 310 to relay the call between the first external electronic device 210 and the second external electronic device.

According to various embodiments, the processor 300 may control the communication circuit 310 to transmit and/or receive information on the application program shared with the first external electronic device 210 to and/or from the second external electronic device via the data channel with respect to the second external electronic device. According to an embodiment, the processor 300 may control the communication circuit 310 to transmit, to the second external electronic device, the information (e.g., a control signal) on the application program, which is received from the first external electronic device 210 by the electronic device 101. The processor 300 may control the communication circuit 310 to transmit, to the first external electronic device 210, the information (e.g., a control signal) on the application program, which is received from the second external electronic device. For example, the processor 300 may control the communication circuit 310 to relay the information on the application program between the first external electronic device 210 and the second external electronic device.

According to an embodiment, the second external electronic device may restore the driving state of the application program shared by the electronic device 101 and the first external electronic device 210, based on the application program and the state information on the application program provided from the electronic device 101. The second external electronic device may transmit and/or receive information (or data) on the application program to and/or from the first external electronic device 210 via the electronic device 101 in a state where the call is connected to the first external electronic device 210 via the electronic device 101. When a touch input related to the application program is received (or acquired), the second external electronic device may convert coordinates of the touch input, based on the resolution (e.g., the resolution of the touch area) of the electronic device 101, and transmit the converted coordinates to the electronic device 101.

According to various embodiments, when occurrence of the call transfer event is sensed (or detected), the processor 300 may identify (select) the second external electronic device to which the call connection with the first external electronic device 210 is transferred. The processor 300 may control the communication circuit 310 to establish the data channel between the electronic device 101 and the second external electronic device.

According to various embodiments, the processor 300 may control the communication circuit 310 to transmit and/or receive call information associated with the first external electronic device 210 to and/or from the second external electronic device via the data channel with respect to the second external electronic device. According to an embodiment, the processor 300 may control the communication circuit 310 to transmit, to the second external electronic device, the call information (e.g., voice and/or video) received from the first external electronic device 210 by the electronic device 101. The processor 300 may control the communication circuit 310 to transmit, to the first external electronic device 210, the call information (e.g., voice and/or video) received from the second external electronic device. For example, the processor 300 may control the communication circuit 310 to relay the call between the first external electronic device 210 and the second external electronic device.

According to various embodiments, the processor 300 may control the communication circuit 310 to transmit and/or receive information on the application program shared with the first external electronic device 210 to and/or from the second external electronic device via the data channel with respect to the second external electronic device. According to an embodiment, the processor 300 may output the information on the application program, which is received from the first external electronic device 210 by the electronic device 101. For example, the outputting of the information on the application program may include a series of operations for displaying a processing result of the information on the application program, which is received from the first external electronic device 210, on a display of the electronic device 101. According to an embodiment, the processor 300 may control the communication circuit 310 to transmit output information (e.g., a display screen) on the application program to the second external electronic device.

According to an embodiment, the processor 300 may output the information (e.g., an input signal) on the application program, which is received from the second external electronic device. For example, the outputting of the information on the application program may include a series of operations for displaying a processing result of the information on the application program, which is received from the second external electronic device, on the display of the electronic device 101. According to an embodiment, the processor 300 may control the communication circuit 310 to transmit the processing result related to the application program to the first external electronic device 210. For example, the processor 300 may control the communication circuit 310 to relay (e.g., mirroring) the information on the application program between the first external electronic device 210 and the second external electronic device.

According to an embodiment, the second external electronic device may output the information on the application program and/or call information associated with the first external electronic device 210 provided from the electronic device 101. For example, the second external electronic device may output the call information (e.g., voice and/or video) received from the first external electronic device 210, which is provided by the electronic device 101. The second external electronic device may transmit call-related information collected via an audio input device (e.g., a microphone) of the second external electronic device to the first external electronic device 210 via the electronic device 101. For example, the second external electronic device may output (or display), on a display of the second external electronic device, the output information of the application program, which is provided by the electronic device 101. When a touch input related to the application program is received (or acquired), the second external electronic device may convert coordinates of the touch input, based on the resolution (e.g., the resolution of the touch area) of the electronic device 101, and transmit the converted coordinates to the electronic device 101.

According to various embodiments, the communication circuit 310 may support transmission and/or reception of signals and/or data to and/or from at least one external electronic device (e.g., the electronic device 102 or 104 or the server 108 in FIG. 1, and the first external electronic device 210 or the second external electronic device of FIG. 2).

According to various embodiments, the memory 320 may store various data used by at least one element (e.g., the processor 300 and/or the communication circuit 310) of the electronic device 101. For example, the data may include state information on the application program. According to one embodiment, the memory 320 may store instructions executable by the processor 300.

According to various embodiments, an electronic device (e.g., the electronic device 101 of FIG. 1, 2, or 3) may include a communication circuit (e.g., the wireless communication module 192 of FIG. 1 or the communication circuit 310 of FIG. 3) and a processor (e.g., the processor 120 of FIG. 1 or the processor 300 of FIG. 3) operatively connected to the communication circuit. According to an embodiment, the processor may connect a call to a first external electronic device (e.g., the first external electronic device 210 of FIG. 2, 6, 9, or 12) via a server (e.g., the server 200 of FIG. 2, 6, 9, or 12) through the communication circuit. According to an embodiment, the processor may transmit and/or receive data related to an application program to and/or from the first external electronic device via direct communication with the first external electronic device. According to an embodiment, the processor may store state information on the application program, based on occurrence of an event related to transferring of the call connection from the first external electronic device to the second external electronic device. According to an embodiment, the processor may transmit the state information on the application program to a second external electronic device via direct communication with the second external electronic device (e.g., second external electronic device 600 of FIG. 6, 9, or 12). According to an embodiment, the processor may transmit, to the server, information on transferring of the call connection to the second external electronic device.

According to various embodiments, the processor may, based on the occurrence of the event related to transferring of the call connection with the first external electronic device, transmit, to the first external electronic device via the server, the information on transferring of the call connection.

According to various embodiments, the processor may terminate driving of the application program, based on transmission of the information on transferring of the call connection.

According to various embodiments, the processor may, in a state where the call is connected to the first external electronic device, acquire the application program from the server, establish a data channel related to the application program with respect to the first external electronic device, and transmit and/or receive the data related to the application program to and/or from the first external electronic device via the data channel established with respect to the first external electronic device.

According to various embodiments, the processor may download the application program from the server, based on a real-time communication (RTC) function in a state where the call is connected to the first external electronic device.

According to various embodiments, the state information on the application program may include at least one of identification information of the first external electronic device or information on a current driving state of the application program.

According to various embodiments, the processor may release the call connection with the first external electronic device, based on a response signal for the information on transferring of the call connection to the second external electronic device.

According to various embodiments, the second external electronic device may include at least one external electronic device in which a call connection state associated with the electronic device is a holding call state.

According to various embodiments, the processor may release the call connection with the second external electronic device, based on a response signal for the information on transferring of the call connection to the second external electronic device.

According to various embodiments, the server may include an external electronic device supporting an Internet protocol (IP) multimedia subsystem (IMS) function.

Figure 4:
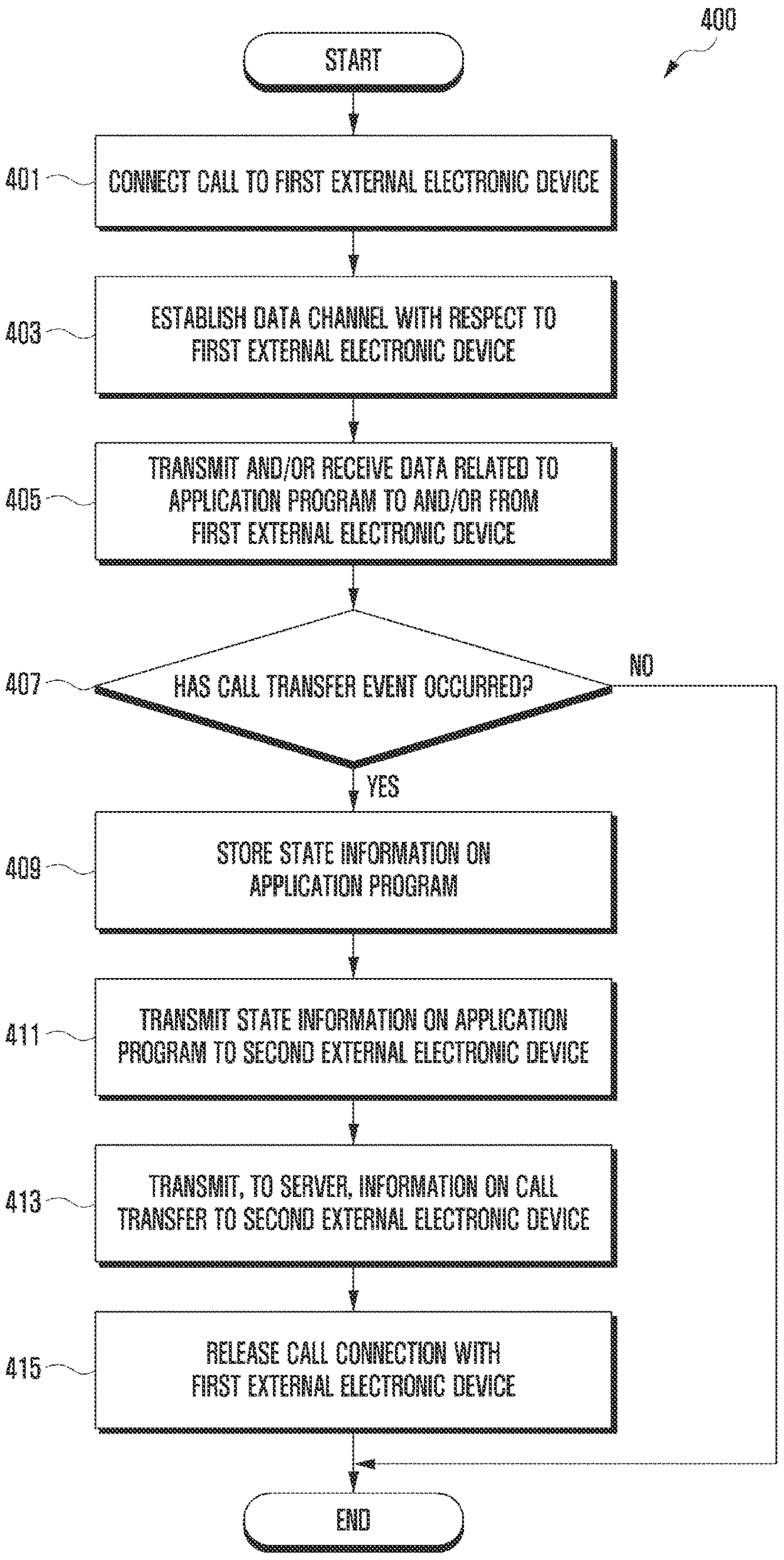
FIG. 4 is a flowchart for transferring a call associated with a first external electronic device to a second external electronic device by an electronic device according to an embodiment of the disclosure.

FIG. 4 is a flowchart for transferring a call associated with a first external electronic device to a second external electronic device by the electronic device according to an embodiment of the disclosure. In the following embodiments, respective operations may be sequentially performed, but are not necessarily performed sequentially. For example, the order of respective operations may be changed, and at least two operations may be performed in parallel. As an example, the electronic device of FIG. 4 may be the electronic device 101 of FIG. 1, 2, or 3.

Referring to FIG. 4, flowchart 400 illustrates that the electronic device (e.g., the processor 120 of FIG. 1 or the processor 300 of FIG. 3) may connect a call to the first external electronic device 210, in operation 401. According to an embodiment, when occurrence of a call connection event related to the first external electronic device 210 is sensed (or detected), the processor 300 may control the communication circuit 310 to establish a call connection with the first external electronic device 210 via the server 200 (e.g., an IMS server). The processor 300 may establish a data channel with respect to the server 200, based on a control signal transmitted and/or received via the server 200 for the call connection with the first external electronic device 210. The processor 300 may download an application program to be shared with the first external electronic device 210 via the data channel with respect to the server 200. For example, the call connection event may occur based on at least one of execution of an application program or function related to the call, an input related to the call connection, reception of a signal related to the call connection, or acquisition of motion information on the call connection. For example, the application program may be driven in the electronic device 101 via a web browser (or a web page or a web view) regardless of an operating system (OS) of the electronic device 101, without being installed in the electronic device 101. For example, the application program may be configured based on a hypertext markup language (HTML) or Java script.

According to various embodiments, in operation 403, the electronic device (e.g., the processor 120 or 300) may establish a data channel with respect to the first external electronic device 210. According to an embodiment, the processor 300 may transmit information (e.g., a re-invite message) related to establishment of the data channel related to the application program to the first external electronic device 210 via the server 200. The processor 300 may determine that the data channel with respect to the first external electronic device 210 has been established, based on information (e.g., 200 OK) on acceptance of establishment of the data channel related to the application program, which is received via the server 200.

According to various embodiments, in operation 405, in the state where the call is connected to the first external electronic device 210, the electronic device (e.g., the processor 120 or 300) may transmit and/or receive information (or data) on the application program to and/or from the first external electronic device 210. According to an embodiment, the state where the call is connected to the first external electronic device 210 may include a state of outputting call-related information received from the first external electronic device 210 via an output device (e.g., an audio output device and/or a display) of the electronic device 101 and transmitting call-related information acquired via an input device (e.g., an audio input device and/or a camera) of the electronic device 101 to the first external electronic device 210. According to an embodiment, the processor 300 may process information on the application program, which is received from the first external electronic device 210, and output the processed information via the output device (e.g., the audio output device and/or the display) of the electronic device 101. The processor 300 may process information on the application program, which is acquired via the input device (e.g., the audio input device and/or the camera) of the electronic device 101, and output the processed information via the output device (e.g., the audio output device and/or the display) of the electronic device 101. The processor 300 may control the communication circuit 310 to transmit, to the first external electronic device 210, the information on the application program, which is acquired via the input device of the electronic device 101, or a processing result of the information on the application program. For example, the electronic device 101 and the first external electronic device 210 may transmit and/or receive the information (or data) on the application program via the data channel established for direct communication (e.g., P2P) between the electronic device 101 and the first external electronic device 210. According to an embodiment, the operations of the electronic device 101 in operations 401 to 405 of FIG. 4 may include the operations of the electronic device 101 in operations 211 to 231 of FIG. 2.

According to various embodiments, in operation 407, the electronic device (e.g., the processor 120 or 300) may identify whether a call transfer event related to the call associated with the first external electronic device 210 is sensed. As an example, the call transfer event may occur based on at least one of an input related to a call transfer, reception of a signal related to a call transfer, or acquisition of motion information related to a call transfer.

According to various embodiments, if occurrence of the call transfer event related to the call associated with the first external electronic device 210 is not sensed (e.g., "No" in operation 407), the electronic device (e.g., the processor 120 or 300) may terminate an embodiment for transferring of the call associated with the first external electronic device to a second external electronic device. According to an embodiment, the processor 300 may control the communication circuit 310 to maintain the call connection of the electronic device 101 and the first external electronic device 210, and sharing of the application program.

According to various embodiments, if occurrence of the call transfer event related to the call associated with the first external electronic device 210 is sensed (e.g., "Yes" in operation 407), the electronic device (e.g., the processor 120 or 300) may store, in operation 409, the state information on the application program shared with the first external electronic device 210. According to an embodiment, when the occurrence of the call transfer event is sensed, the processor 300 may store, in the memory 320, the state information on the application program via a first control command (e.g., savestate( ) application programming interface (API)) related to the application program shared with the first external electronic device 210. For example, the state information on the application program may be stored in the form of <key, value> based on identification information (e.g., a phone number) of the first external electronic device 210 connected to the electronic device 101 via the call. As an example, the key may represent the identification information (e.g., a phone number) of the first external electronic device 210. As an example, the value may represent information on a current state (or current driving state) of the application program.

According to various embodiments, in operation 411, the electronic device (e.g., the processor 120 or 300) may transmit the state information on the application program shared with the first external electronic device 210 to the second external electronic device to which the call connection with the first external electronic device 210 is to be transferred. According to an embodiment, the processor 300 may control the communication circuit 310 to establish a data channel between the electronic device 101 and the second external electronic device. The processor 300 may control the communication circuit 310 to transmit the state information on the application program to the second external electronic device via the data channel with respect to the second external electronic device. For example, the second external electronic device may include an external electronic device in which the call connection with the electronic device 101 is in a holding call state. For example, the second external electronic device may include an external electronic device used by a user of the electronic device 101 or an external electronic device used by a user other than the user of the electronic device 101.

According to various embodiments, in operation 413, the electronic device (e.g., the processor 120 or 300) may transmit, to the server 200, information on the call transfer to the second external electronic device.

According to various embodiments, in operation 415, the electronic device (e.g., the processor 120 or 300) may release the call connection with the first external electronic device 210, based on the call transfer to the second external electronic device. According to an embodiment, when information on the release of the call connection is received from the server 200, based on transmission of the information on the call transfer to the second external electronic device, the processor 300 may control the communication circuit 310 to release the call connection with the first external electronic device 210. The processor 300 may control the communication circuit 310 to also release the call connection with the second external electronic device which is in the holding call state for the call connection.

Figure 5:
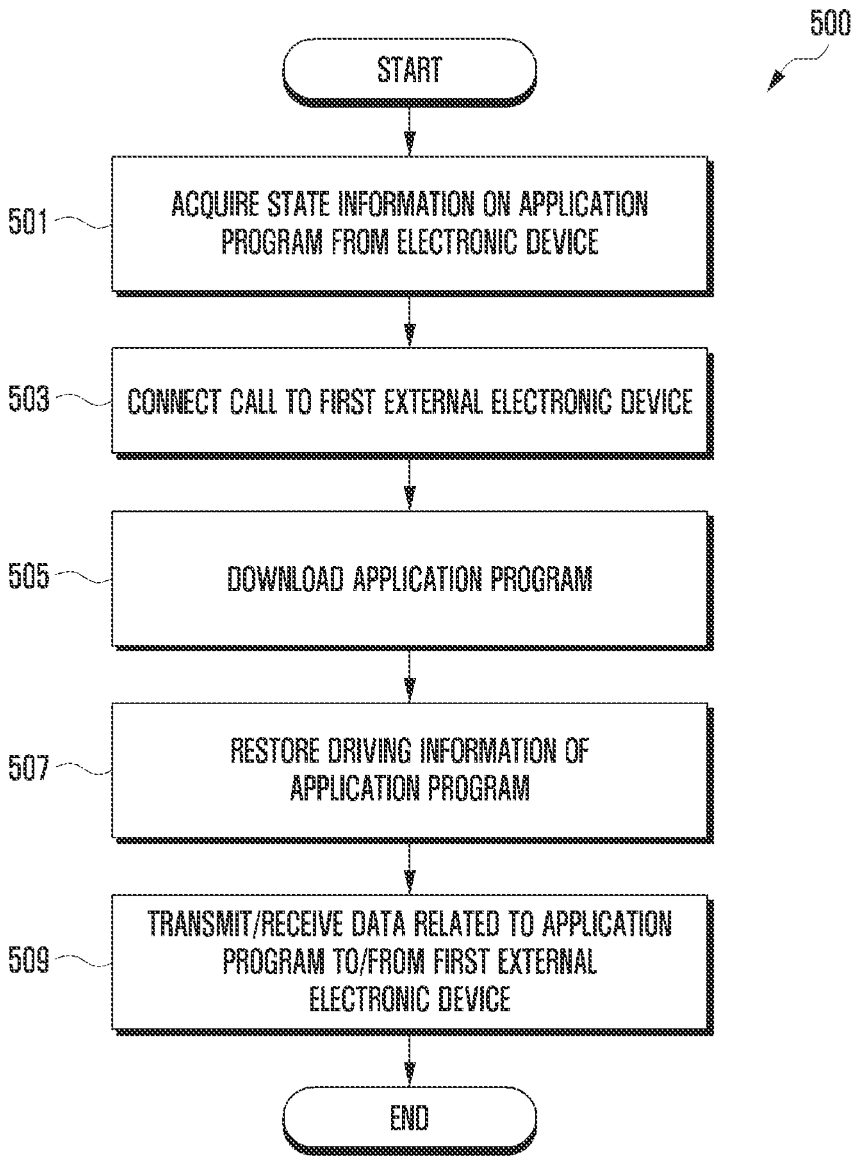
FIG. 5 is a flowchart for providing an interactive calling function associated with a first external electronic device in a second external electronic device according to an embodiment of the disclosure.

FIG. 5 is a flowchart for providing an interactive calling function associated with a first external electronic device in a second external electronic device according to an embodiment of the disclosure. In the following embodiments, respective operations may be sequentially performed, but are not necessarily performed sequentially. For example, the order of respective operations may be changed, and at least two operations may be performed in parallel. As an example, the second external electronic device of FIG. 5 may be the electronic device 101 of FIG. 1 or 3.

Referring to FIG. 5, flowchart 500 illustrates that, in operation 501, the second external electronic device (e.g., the processor 120 of FIG. 1 or the processor 300 of FIG. 3) may acquire state information on an application program from the electronic device 101. According to an embodiment, the second external electronic device (e.g., the processor 300) may establish a data channel with respect to the electronic device 101, based on information on a request for establishment of a data channel, which is received from the electronic device 101. The second external electronic device (e.g., the processor 300) may receive the state information on the application program via the data channel with respect to the electronic device 101. For example, the state information on the application program may include information on a current driving state of the application program shared by the electronic device 101 and the first external electronic device 210. For example, the data channel with respect to the electronic device 101 may be released based on acquisition of the state information on the application program.

According to various embodiments, in operation 503, the second external electronic device (e.g., the processor 120 or 300) may connect a call to the first external electronic device 210. According to an embodiment, the second external electronic device (e.g., the processor 300) may connect a call to the first external electronic device 210, based on a request signal (e.g., an invite message) related to the call connection, which is received from the server 200. According to an embodiment, the request signal related to the call connection may be transmitted by the server 200, based on information on a call transfer to the second external electronic device, which is received from the electronic device 101 by the server 200.

According to various embodiments, in operation 505, the second external electronic device (e.g., the processor 120 or 300) may acquire the application program shared by the electronic device 101 and the first external electronic device 210. According to an embodiment, when the call is connected to the first external electronic device 210, the second external electronic device (e.g., the processor 300) may download the application program via the data channel established in association with the server 200.

According to various embodiments, in operation 507, the second external electronic device (e.g., the processor 120 or 300) may restore a driving state (or driving information) of the application program shared by the electronic device 101 and the first external electronic device 210. According to an embodiment, the second external electronic device (e.g., the processor 300) may acquire the state information on the application program, which is related to the first external electronic device 210, via a second control command (e.g., restorestate( ) API) related to the application program. The second external electronic device (e.g., the processor 300) may restore the driving state of the application program shared by the electronic device 101 and the first external electronic device 210, based on the state information on the application program, which is related to the first external electronic device 210.

According to various embodiments, in the state where the call is connected to the first external electronic device 210, the second external electronic device (e.g., the processor 120 or 300) may transmit and/or receive information (or data) on the application program to and/or from the first external electronic device 210, in operation 509. According to an embodiment, the state where the call is connected to the first external electronic device 210 may include a state of outputting call-related information received from the first external electronic device 210 via an output device (e.g., an audio output device and/or a display) of the second external electronic device and transmitting call-related information acquired via an input device (e.g., an audio input device and/or a camera) of the second external electronic device to the first external electronic device 210. According to an embodiment, the second external electronic device (e.g., the processor 300) may process information on the application program, which is received from the first external electronic device 210, and output the processed information via the output device (e.g., the audio output device and/or the display) of the second external electronic device. The second external electronic device (e.g., the processor 300) may process the information on the application program, which is acquired via the input device (e.g., the audio input device and/or the camera) of the second external electronic device, and output the processed information via the output device (e.g., the audio output device and/or the display) of the second external electronic device. The second external electronic device (e.g., the processor 300) may transmit, to the first external electronic device 210, the information on the application program, which is acquired via the input device of the second external electronic device, or a result of processing the information on the application program. For example, the second external electronic device and the first external electronic device 210 may transmit and/or receive the information (or data) on the application program via the data channel established for direct communication (e.g., P2P) between the second external electronic device and the first external electronic device 210.

According to various embodiments, if the state information on the application program, which is related to the first external electronic device 210, does not exist, the second external electronic device (e.g., the processor 300) may determine that restoration of the driving state of the application program has failed. When it is determined that restoration of the driving state of the application program has failed, the second external electronic device (e.g., the processor 300) may newly share the application program with the first external electronic device 210.

Figure 6:
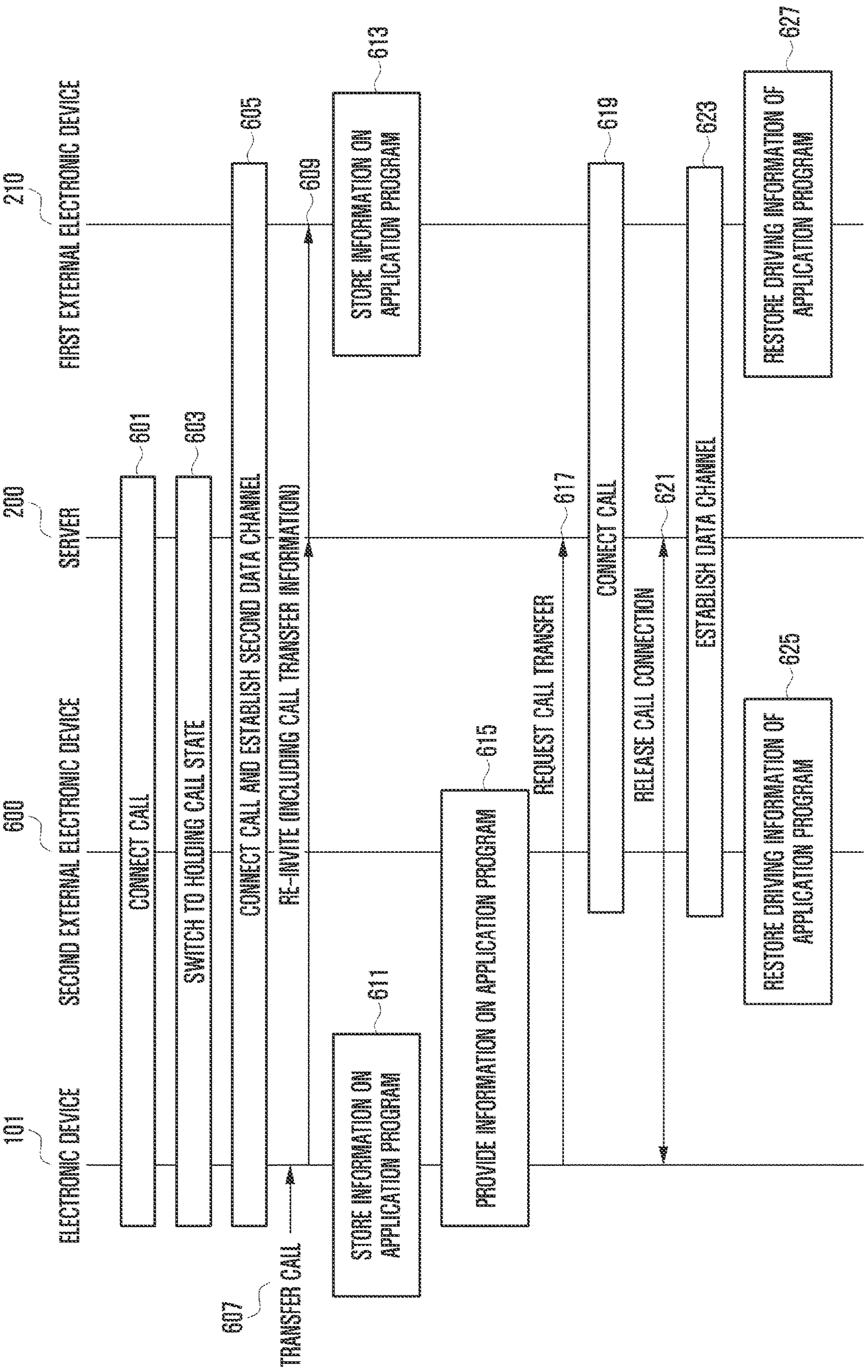
FIG. 6 is an example for transferring a call associated with a first external electronic device to a second external electronic device by an electronic device according to an embodiment of the disclosure.

FIG. 6 is an example for transferring a call associated with a first external electronic device to a second external electronic device by the electronic device according to an embodiment of the disclosure.

Referring to FIG. 6, in operation 601, the electronic device 101 may connect a call to a second external electronic device 600. According to an embodiment, when occurrence of a call connection event related to the second external electronic device 600 is sensed (or detected), the electronic device 101 may transmit, to the second external electronic device 600 via the server 200, a request signal (e.g., an invite message) related to a call connection. The electronic device 101 may connect the call to the second external electronic device 600, based on reception of information on acceptance of the call connection from the second external electronic device 600 via the server 200.

According to various embodiments, in operation 603, the electronic device 101 may switch the call connection with the second external electronic device 600 to a holding call state. For example, the holding call state may include a state in which the call between the electronic device 101 and the second external electronic device 600 has been connected, but an input and an output of call-related information (e.g., voice and/or video) are limited in the electronic device 101 and/or the second external electronic device 600.

According to various embodiments, in operation 605, the electronic device 101 may connect the call to the first external electronic device 210 and establish a second data channel. According to an embodiment, based on operation 211 to operation 231 of FIG. 2, the electronic device 101 may connect the call to the first external electronic device 210 and establish the second data channel for sharing an application program. According to an embodiment, the electronic device 101 and the first external electronic device 210 may transmit and/or receive information (or data) on the application program via the second data channel. For example, the second data channel may include an IMS data channel established for direct communication (e.g., P2P) between the electronic device 101 and the first external electronic device 210.

According to various embodiments, in operation 607, the electronic device 101 may identify whether a call transfer event associated with the first external electronic device 210 occurs. As an example, the call transfer event may occur based on at least one of an input related to a call transfer, reception of a signal related to a call transfer, or acquisition of motion information related to a call transfer.

According to various embodiments, when occurrence of the call transfer event associated with the first external electronic device 210 is sensed in operation 609, the electronic device 101 may transmit call transfer information (e.g., m=application 0) to the first external electronic device 210 via the server 200, in operation 609. According to an embodiment, the electronic device 101 may terminate driving of the application program shared with the first external electronic device 210, based on transmission of the call transfer information. The electronic device 101 may discard (or ignore) an input detected (or received) after termination of the driving of the application program. For example, the call transfer information may be included in a re-invite message so as to be transmitted to the first external electronic device 210.

According to various embodiments, when occurrence of the call transfer event related to the first external electronic device 210 is sensed in operation 607, the electronic device 101 may store state information on the application program shared with the first external electronic device 210, in operation 611. For example, the state information on the application program may be stored in the form of <key, value> based on identification information (e.g., a phone number) of the first external electronic device 210 connected to the electronic device 101 via the call. As an example, the key may represent the identification information (e.g., a phone number) of the first external electronic device 210. As an example, the value may represent information on a current state (or current driving state) of the application program.

According to various embodiments, in operation 613, the first external electronic device 210 may store the state information on the application program shared with the electronic device 101, based on the call transfer information received from the electronic device 101 via the server 200. According to an embodiment, the first external electronic device 210 may terminate driving of the application program shared with the electronic device 101, based on reception of the call transfer information. The first external electronic device 210 may discard (or ignore) an input detected (or received) after termination of the driving of the application program. For example, the state information on the application program may be stored in the form of <key, value> based on identification information (e.g., a phone number) of the electronic device 101 connected to the first external electronic device 210 via the call. As an example, the key may represent the identification information (e.g., a phone number) of the electronic device 101. As an example, the value may represent information on a current state (or current driving state) of the application program.

According to various embodiments, in operation 615, the electronic device 101 may transmit the state information on the application program shared with the first external electronic device 210 to the second external electronic device 600 which is in a holding call state for the call connection. According to an embodiment, the electronic device 101 may establish a data channel with respect to the second external electronic device 600. The electronic device 101 may transmit the state information on the application program shared with the first external electronic device 210 to the second external electronic device 600 via the data channel with respect to the second external electronic device 600. For example, the data channel with respect to the second external electronic device 600 may be released based on transmission of the state information on the application program shared with the first external electronic device 210. For example, the data channel with respect to the second external electronic device 600 may be released based on a request of the second external electronic device 600. For example, the second external electronic device 600 may be used by the same user as that of the electronic device 101 or a user other than the user of the electronic device 101.

According to various embodiments, in operation 617, the electronic device 101 may transmit, to the server 200, information on a call transfer to the second external electronic device 600. For example, the information on the call transfer to the second external electronic device 600 may be included in a re-invite message so as to be transmitted to the server 200.

According to various embodiments, in operation 619, the first external electronic device 210 and the second external electronic device 600 may perform call connection based on the information on the call transfer to the second external electronic device 600 by the electronic device 101. According to an embodiment, the server 200 may transmit, to the first external electronic device 210 and the second external electronic device 600, a request signal related to the call connection, based on the information on the call transfer to the second external electronic device 600. The first external electronic device 210 and the second external electronic device 600 may perform call connection based on the request signal related to the call connection received from the server 200. For example, the request signal related to the call connection may include information (e.g., identification information) for call connection, which relates to the first external electronic device 210 and the second external electronic device 600.

According to various embodiments, in operation 621, the server 200 may transmit, to the electronic device 101, a request signal related to release of the call connection, based on the call connection with the first external electronic device 210 and the second external electronic device 600. According to an embodiment, the electronic device 101 may release the call connection with the first external electronic device 210 and the second external electronic device 600, based on the request signal related to the release of the call connection, which is received from the server 200.

According to various embodiments, in operation 623, the first external electronic device 210 and the second external electronic device 600 may establish a data channel for sharing an application program. According to an embodiment, during the call connection, the first external electronic device 210 and the second external electronic device 600 may download an application program via the data channel established in association with the server 200. For example, the application program may include the application program shared by the electronic device 101 and the first external electronic device 210. According to an embodiment, the first external electronic device 210 and the second external electronic device 600 may establish the data channel for sharing the application program downloaded from the server 200.

According to various embodiments, in operation 625, the second external electronic device 600 may restore the state information of the application program shared by the electronic device 101 and the first external electronic device 210, based on the state information on the application program, which is acquired from the electronic device 101. According to an embodiment, the second external electronic device 600 may acquire the state information on the application program, which is related to the first external electronic device 210, via a second control command (e.g., restorestate( ) API) related to the application program. The second external electronic device 600 may restore the state information (or driving information) of the application program shared by the electronic device 101 and the first external electronic device 210, based on the state information on the application program, which is related to the first external electronic device 210.

According to various embodiments, in operation 627, the first external electronic device 210 may restore the state information (or driving information) of the application program shared by the electronic device 101 and the first external electronic device 210, based on the state information on the application program, which is stored based on the call transfer information received from the electronic device 101.

According to various embodiments, the first external electronic device 210 and the second external electronic device 600 may transmit and/or receive the information (or data) on the application program via the data channel. For example, the data channel may include an IMS data channel established for direct communication (e.g., P2P) between the first external electronic device 210 and the second external electronic device 600.

Figure 7:
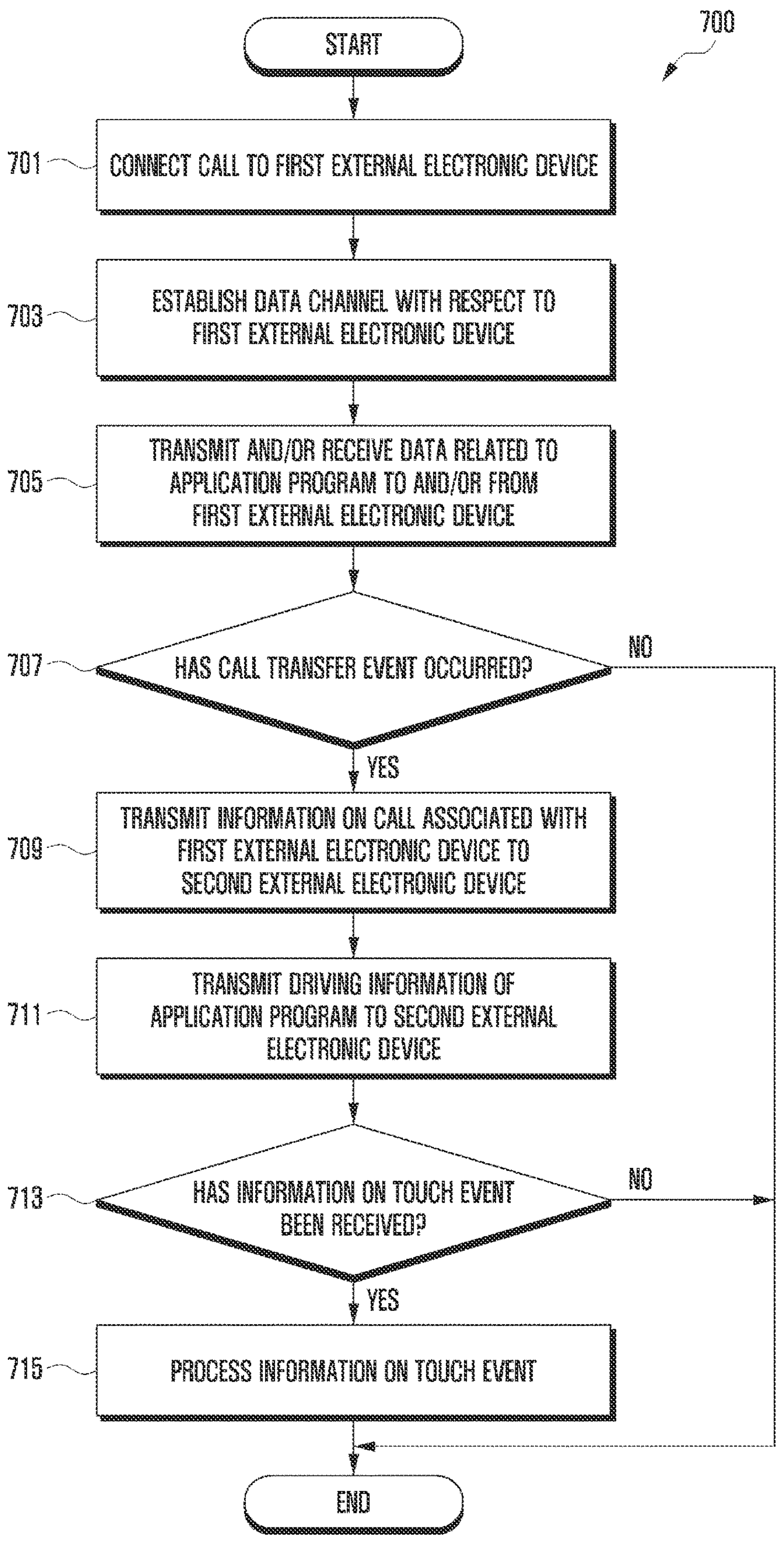
FIG. 7 is an example for transferring a call associated with a first external electronic device to a second external electronic device by an electronic device according to an embodiment of the disclosure.

FIG. 7 is a flowchart for transferring a call associated with a first external electronic device to a second external electronic device by the electronic device according to an embodiment of the disclosure. In the following embodiments, respective operations may be sequentially performed, but are not necessarily performed sequentially. For example, the order of respective operations may be changed, and at least two operations may be performed in parallel. As an example, the electronic device of FIG. 7 may be the electronic device 101 of FIG. 1, 2, or 3.

Referring to FIG. 7, flowchart 700 illustrates that the electronic device (e.g., the processor 120 of FIG. 1 or the processor 300 of FIG. 3) may connect a call to the first external electronic device 210, in operation 701. According to an embodiment, when occurrence of a call connection event related to the first external electronic device 210 is sensed (or detected), the processor 300 may control the communication circuit 310 to connect a call to the first external electronic device 210 via the server 200 (e.g., an IMS server). The processor 300 may establish a data channel with respect to the server 200, based on a control signal transmitted to and/or received from the first external electronic device 210 via the server 200, so as to connect the call to the first external electronic device 210. The processor 300 may download an application program to be shared with the first external electronic device 210 via the data channel with respect to the server 200.

According to various embodiments, in operation 703, the electronic device (e.g., the processor 120 or 300) may establish a data channel with respect to the first external electronic device 210. According to an embodiment, the processor 300 may transmit information (e.g., a re-invite message) related to establishment of the data channel related to the application program to the first external electronic device 210 via the server 200. The processor 300 may determine that the data channel with respect to the first external electronic device 210 has been established, based on information (e.g., 200 OK) on acceptance of establishment of the data channel related to the application program, which is received via the server 200.

According to various embodiments, in operation 705, in the state where the call is connected to the first external electronic device 210, the electronic device (e.g., the processor 120 or 300) may transmit and/or receive information (or data) on the application program to and/or from the first external electronic device 210. According to an embodiment, the state where the call is connected to the first external electronic device 210 may include a state of outputting call-related information received from the first external electronic device 210 via an output device (e.g., an audio output device and/or a display) of the electronic device 101 and transmitting call-related information acquired via an input device (e.g., an audio input device and/or a camera) of the electronic device 101 to the first external electronic device 210. According to an embodiment, the processor 300 may process information on the application program, which is received from the first external electronic device 210, and output the processed information via the output device of the electronic device 101. The processor 300 may process information (e.g., touch input information) on the application program, which is acquired via the input device of the electronic device 101, and output the processed information via the output device of the electronic device 101. The processor 300 may control the communication circuit 310 to transmit, to the first external electronic device 210, the information on the application program, which is acquired via the input device of the electronic device 101, or a processing result of the information on the application program. According to an embodiment, the operations of the electronic device 101 in operations 701 to 705 of FIG. 7 may include the operations of the electronic device 101 in operations 211 to 231 of FIG. 2.

According to various embodiments, in operation 707, the electronic device (e.g., the processor 120 or 300) may identify whether a call transfer event related to the call associated with the first external electronic device 210 is sensed. As an example, the call transfer event may occur based on at least one of an input related to a call transfer, reception of a signal related to a call transfer, or acquisition of motion information related to a call transfer.

According to various embodiments, if occurrence of the call transfer event related to the call associated with the first external electronic device 210 is not sensed (e.g., "No" in operation 707), the electronic device (e.g., the processor 120 or 300) may terminate an embodiment for transferring of the call associated with the first external electronic device to a second external electronic device. According to an embodiment, the processor 300 may control the communication circuit 310 to maintain the call connection of the electronic device 101 and the first external electronic device 210, and sharing of the application program.

According to various embodiments, if occurrence of the call transfer event related to the call associated with the first external electronic device 210 is sensed (e.g., "Yes" in operation 707), the electronic device (e.g., the processor 120 or 300) may transmit information on the call associated with the first external electronic device 210 to the second external electronic device, in operation 709. For example, the processor 300 may control the communication circuit 310 to relay the call between the first external electronic device 210 and the second external electronic device. According to an embodiment, the processor 300 may control the communication circuit 310 to transmit call information (e.g., voice and/or video) received from the first external electronic device 210 to the second external electronic device in a state where the call is connected to the first external electronic device 210. For example, an output of the electronic device 101 for the call information received from the first external electronic device 210 may be limited based on transferring of the call associated with the first external electronic device 210. According to an embodiment, the processor 300 may control the communication circuit 310 to transmit the call information (e.g., voice and/or video) received from the second external electronic device to the first external electronic device 210. For example, an output of the electronic device 101 for the call information received from the second external electronic device may be limited based on transferring of the call associated with the first external electronic device 210.

According to various embodiments, in operation 711, the electronic device (e.g., the processor 120 or 300) may transmit driving information on the application program shared with the first external electronic device 210 to the second external electronic device. For example, the processor 300 may control the communication circuit 310 to relay information on the application program between the first external electronic device 210 and the second external electronic device. According to an embodiment, the processor 300 may control the communication circuit 310 to transmit the driving information on the application program and state information of the electronic device 101 to the second external electronic device via a data channel with respect to the second external electronic device. According to an embodiment, the processor 300 may control the communication circuit 310 to transmit output information of the application program shared by the electronic device 101 and the first external electronic device 210 to the second external electronic device while the data channel with respect to the first external electronic device 210 is established. For example, the output information of the application program may include an output screen (e.g., a graphic user interface) of the application program shared by the electronic device 101 and the first external electronic device 210. According to an embodiment, when information on the application program is received from the first external electronic device 210, the processor 300 may output a processing result of the information on the application program, which is received from the first external electronic device 210. For example, the outputting of the processing result of the information on the application program may include a series of operations for displaying the processing result of the information on the application program, which is received from the first external electronic device 210, on the display of the electronic device 101. According to an embodiment, the processor 300 may control the communication circuit 310 to transmit the processing result of the information on the application program to the second external electronic device.

According to various embodiments, in operation 713, the electronic device (e.g., the processor 120 or 300) may identify whether information on a touch event is received from the second external electronic device.

According to various embodiments, if information on the touch event is not received from the second external electronic device (e.g., "No" in operation 713), the electronic device (e.g., the processor 120 or 300) may terminate an embodiment for sharing of the application program.

According to various embodiments, if the information on the touch event is received from the second external electronic device (e.g., "Yes" in operation 713), the electronic device (e.g., the processor 120 or 300) may process the information on the touch event, which is received from the second external electronic device, in operation 715. According to an embodiment, the processor 300 may control driving of the application program, based on the touch information on the application program, which is received from the second external electronic device. For example, the controlling the driving of the application program may include a series of operations for displaying a processing result of the touch event related to the application program, which is received from the second external electronic device, on the display of the electronic device 101. According to an embodiment, the processor 300 may control the communication circuit 310 to transmit information on driving of the application program to the first external electronic device 210. For example, the touch information on the application program, which is received from the second external electronic device, may include touch information converted based on a resolution (e.g., a resolution of a touch area) of the electronic device 101.

Figure 8:
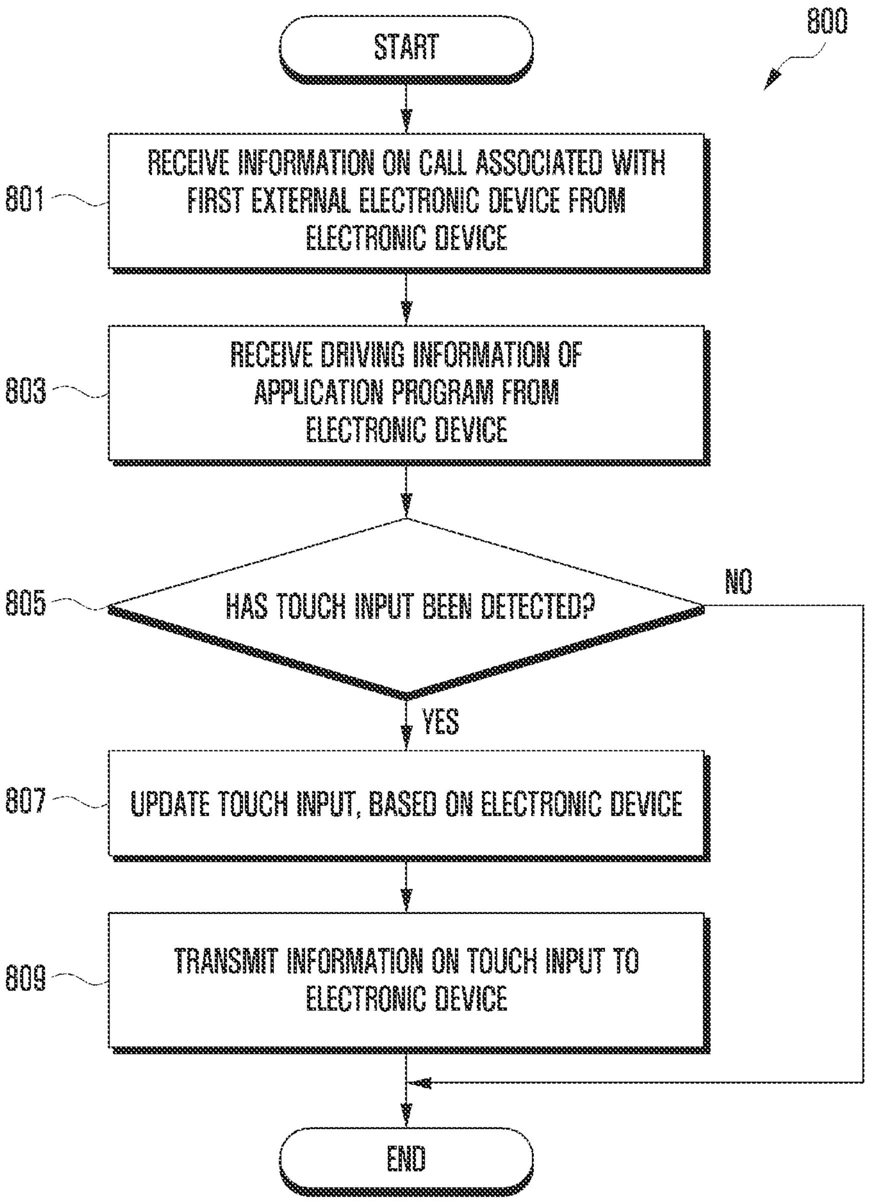
FIG. 8 is a flowchart for providing an interactive calling function associated with a first external electronic device in a second external electronic device according to an embodiment of the disclosure.

FIG. 8 is a flowchart for providing an interactive calling function associated with a first external electronic device in a second external electronic device according to an embodiment of the disclosure. In the following embodiments, respective operations may be sequentially performed, but are not necessarily performed sequentially. For example, the order of respective operations may be changed, and at least two operations may be performed in parallel. As an example, the second external electronic device of FIG. 8 may be the electronic device 101 of FIG. 1 or 3.

Referring to FIG. 8, flowchart 800 illustrates that in operation 801, the second external electronic device (e.g., the processor 120 of FIG. 1 or the processor 300 of FIG. 3) may receive information on a call associated with the first external electronic device 210 from the electronic device 101. According to an embodiment, the second external electronic device (e.g., the processor 300) may establish a data channel with respect to the electronic device 101, based on information on a request for establishment of a data channel, which is received from the electronic device 101. The second external electronic device (e.g., the processor 300) may acquire call information (e.g., voice and/or video) received from the first external electronic device 210 via the data channel with respect to the electronic device 101. The second external electronic device (e.g., the processor 300) may output the call information received from the first external electronic device 210, via an output device (e.g., an audio output device and/or a display) of the second external electronic device. According to an embodiment, the second external electronic device (e.g., the processor 300) may transmit call information collected via an input device (e.g., an audio input device and/or a camera) of the second external electronic device to the first external electronic device 210 via the electric device 101.

According to various embodiments, in operation 803, the second external electronic device (e.g., the processor 120 or 300) may receive driving information on an application program shared with the first external electronic device 210 from the electronic device 101. According to an embodiment, the second external electronic device (e.g., the processor 300) may receive output information of the application program shared by the electronic device 101 and the first external electronic device 210, via the data channel with respect to the electronic device 101. The second external electronic device (e.g., the processor 300) may output the output information of the application program via the output device (e.g., the audio output device and/or the display) of the second external electronic device. For example, the output information of the application program may be displayed on a display of the second external electronic device.

According to various embodiments, in operation 805, the second external electronic device (e.g., the processor 120 or 300) may identify whether a touch input (or user input) related to the application program is detected (or received). For example, the touch input related to the application program may include a touch input corresponding to the output information of the application program, which is displayed on the display of the second external electronic device.

According to various embodiments, if the touch input (or user input) related to the application program is not detected (or not received) (e.g., "No" in operation 805), the second external electronic device (e.g., the processor 120 or 300) may terminate an embodiment for providing an interactive calling function associated with the first external electronic device.

According to various embodiments, if the touch input (or user input) related to the application program is detected (or received) (e.g., "Yes" in operation 805), the second external electronic device (e.g., the processor 120 or 300) may update the touch input based on a resolution (e.g., a resolution of a touch area) of the electronic device 101, in operation 807. For example, the updating of the touch input may include a series of operations for converting touch coordinates detected via the second external electronic device to correspond to the electronic device 101, based on a difference between resolutions (e.g., resolutions of touch areas) of the second external electronic device and the electronic device 101.

According to various embodiments, in operation 809, the second external electronic device (e.g., the processor 120 or 300) may transmit, to the electronic device 101, information on the touch input updated based on the resolution (e.g., the resolution of the touch area) of the electronic device 101. According to an embodiment, the electronic device 101 may control driving of the application program shared with the first external electronic device 210, based on the information on the touch input, which is acquired from the second external electronic device. The electronic device 101 may transmit the information on driving of the application program to the first external electronic device 210.

Figure 9:
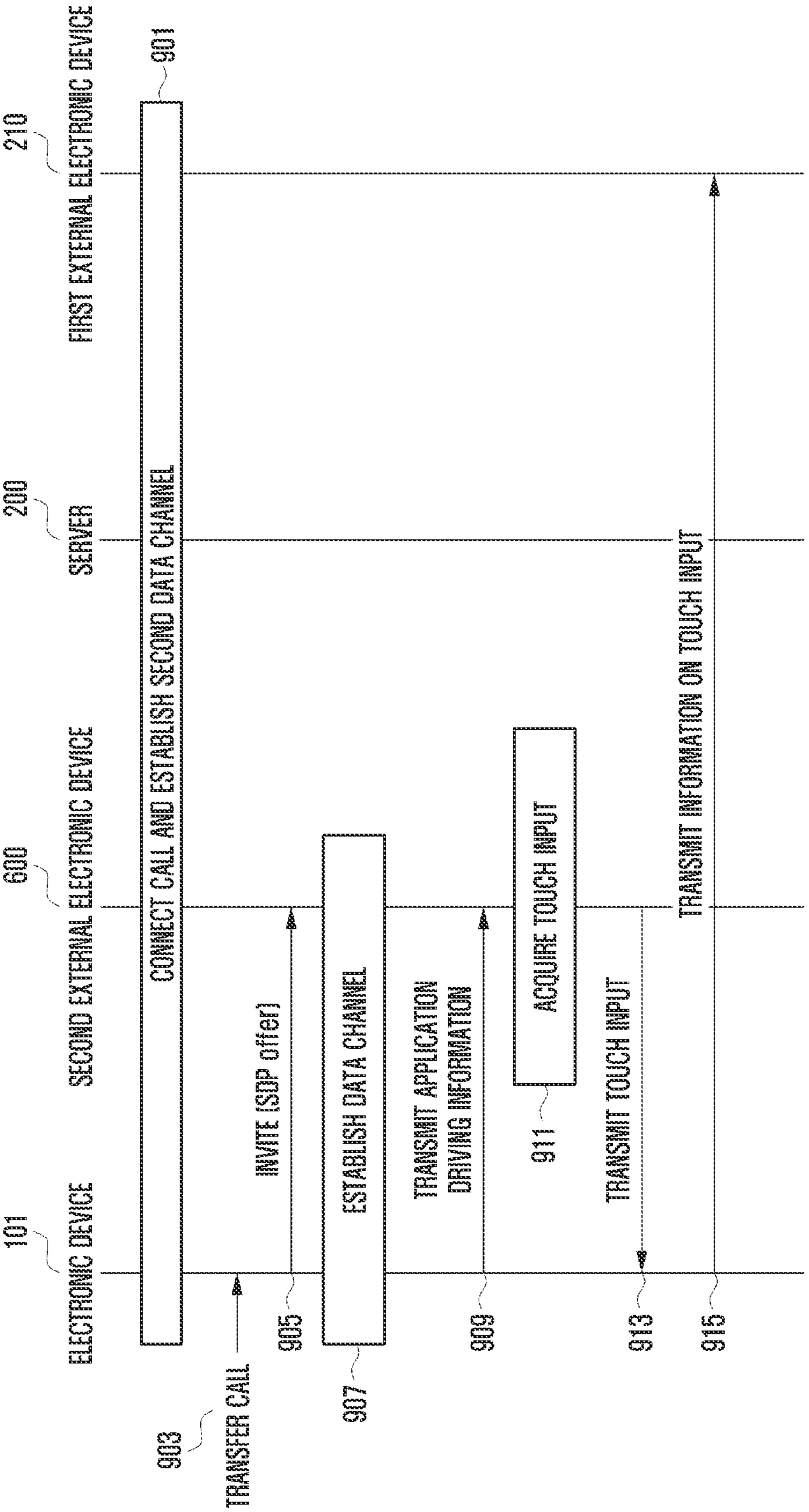
FIG. 9 is an example for transferring a call associated with a first external electronic device to a second external electronic device by an electronic device according to an embodiment of the disclosure.

FIG. 9 is an example for transferring a call associated with a first external electronic device to a second external electronic device by the electronic device according to an embodiment of the disclosure.

Referring to FIG. 9, in operation 901, the electronic device 101 may connect a call to the first external electronic device 210 and establish a second data channel. According to an embodiment, based on operation 211 to operation 231 of FIG. 2, the electronic device 101 may connect the call to the first external electronic device 210 and establish the second data channel for sharing an application program. According to an embodiment, the electronic device 101 and the first external electronic device 210 may transmit and/or receive information (or data) on the application program via the second data channel. For example, the second data channel may include an IMS data channel established for direct communication (e.g., P2P) between the electronic device 101 and the first external electronic device 210.

According to various embodiments, in operation 903, the electronic device 101 may identify whether a call transfer event associated with the first external electronic device 210 occurs. As an example, the call transfer event may occur based on at least one of an input related to a call transfer, reception of a signal related to a call transfer, or acquisition of motion information related to a call transfer. As an example, the call transfer may include a multi-device experience (MDE) in which the call connection of the electronic device 101 with respect to the first external electronic device 210 is transferred to the second external electronic device 600 which is used by a user of the electronic device 101. As an example, the call transfer may include a call transfer in which the call connection of the electronic device 101 with respect to the first external electronic device 210 is transferred to the second external electronic device 600 which is used by a user other than the user of the electronic device 101.

According to various embodiments, when occurrence of the call transfer event associated with the first external electronic device 210 is sensed in operation 905, the electronic device 101 may transmit information (e.g., an invite message) on the call associated with the first external electronic device 210 to the second external electronic device 600, in operation 905. For example, the information on the call associated with the first external electronic device 210 may include request information related to establishment of a data channel to the second external electronic device 600. According to an embodiment, the second external electronic device 600 may output the call information received from the first external electronic device 210, via an output device (e.g., an audio output device and/or a display) of the second external electronic device 600. According to an embodiment, the second external electronic device 600 may transmit call information collected via an input device (e.g., an audio input device and/or a camera) of the second external electronic device 600 to the first external electronic device 210 via the electric device 101.

According to various embodiments, in operation 907, for the electronic device 101 and the second external electronic device 600, a data channel may be established based on the request information on establishment of the data channel.

According to various embodiments, in operation 909, the electronic device 101 may transmit driving information on the application program shared with the first external electronic device 210 to the second external electronic device 600 via the data channel with respect to the second external electronic device 600. According to an embodiment, the electronic device 101 may transmit output information of the application program shared by the electronic device 101 and the first external electronic device 210 to the second external electronic device 600 while the data channel with respect to the first external electronic device 210 is established. For example, the output information of the application program may include an output screen (e.g., a graphic user interface) of the application program shared by the electronic device 101 and the first external electronic device 210. According to an embodiment, when information on the application program is received from the first external electronic device 210, the electronic device 101 may transmit a processing result of the information on the application program, which is received from the first external electronic device 210, to the second external electronic device 600.

According to various embodiments, in operation 911, the second external electronic device 600 may detect a touch input (e.g., user input) related to the application program. For example, the touch input related to the application program may include a touch input corresponding to the output information of the application program, which is displayed on a display of the second external electronic device 600.

According to various embodiments, in operation 913, the second external electronic device 600 may transmit the touch input related to the application program to the electronic device 101. According to an embodiment, the second external electronic device 600 may update the touch input related to the application program, based on a resolution (e.g., a resolution of a touch area) of the electronic device 101. The second external electronic device 600 may transmit, to the electronic device 101, the touch input related to the application program, which has been updated based on the resolution (e.g., the resolution of the touch area) of the electronic device 101. For example, the updating of the touch input may include a series of operations for converting touch coordinates detected via the second external electronic device 600 to correspond to the electronic device 101, based on a difference between resolutions (e.g., resolutions of touch areas) of the second external electronic device 600 and the electronic device 101.

According to various embodiments, the electronic device 101 may process the touch input related to the application program, which is received from the second external electronic device 600. According to an embodiment, the electronic device 101 may control driving of the application program, based on the touch input related to the application program, which is received from the second external electronic device 600. According to an embodiment, in operation 915, the electronic device 101 may transmit information on driving of the application program to the first external electronic device 210.

Figure 10:
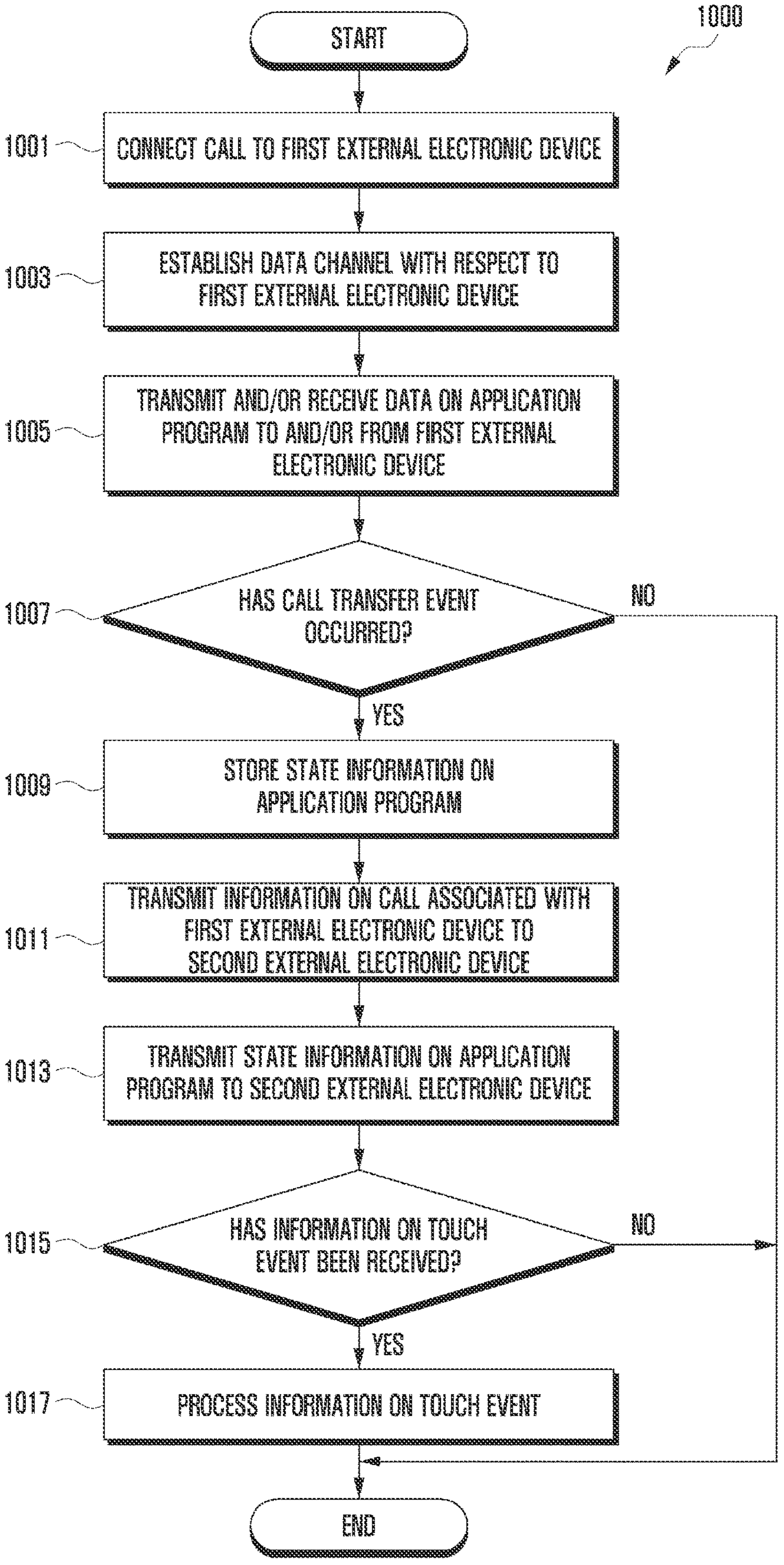
FIG. 10 is a flowchart for transferring a call associated with a first external electronic device to a second external electronic device by an electronic device according to an embodiment of the disclosure.

FIG. 10 is a flowchart for transferring a call associated with a first external electronic device to a second external electronic device by the electronic device according to an embodiment of the disclosure. In the following embodiments, respective operations may be sequentially performed, but are not necessarily performed sequentially. For example, the order of respective operations may be changed, and at least two operations may be performed in parallel. As an example, the electronic device of FIG. 10 may be the electronic device 101 of FIG. 1, 2, or 3.

Referring to FIG. 10, flowchart 1000 illustrates that the electronic device (e.g., the processor 120 of FIG. 1 or the processor 300 of FIG. 3) may connect a call to the first external electronic device 210, in operation 1001. According to an embodiment, when occurrence of a call connection event related to the first external electronic device 210 is sensed (or detected), the processor 300 may control the communication circuit 310 to connect a call to the first external electronic device 210 via the server 200 (e.g., an IMS server). The processor 300 may establish a data channel with respect to the server 200, based on a control signal transmitted to and/or received from the first external electronic device 210 via the server 200, in order to connect the call to the first external electronic device 210. The processor 300 may download an application program to be shared with the first external electronic device 210 via the data channel with respect to the server 200. For example, the application program may include an application program selected via a menu related to an interactive calling function in the electronic device 101 and/or the first external electronic device 210.

According to various embodiments, in operation 1003, the electronic device (e.g., the processor 120 or 300) may establish a data channel with respect to the first external electronic device 210. According to an embodiment, the processor 300 may transmit information (e.g., a re-invite message) related to establishment of the data channel related to the application program to the first external electronic device 210 via the server 200. The processor 300 may determine that the data channel with respect to the first external electronic device 210 has been established, based on information (e.g., 200 OK) on acceptance of establishment of the data channel related to the application program, which is received via the server 200.

According to various embodiments, in operation 1005, in the state where the call is connected to the first external electronic device 210, the electronic device (e.g., the processor 120 or 300) may transmit and/or receive information (or data) on the application program to and/or from the first external electronic device 210. According to an embodiment, the state where the call is connected to the first external electronic device 210 may include a state of outputting call-related information received from the first external electronic device 210 via an output device (e.g., an audio output device and/or a display) of the electronic device 101 and transmitting call-related information acquired via an input device (e.g., an audio input device and/or a camera) of the electronic device 101 to the first external electronic device 210. According to an embodiment, the processor 300 may process information on the application program, which is received from the first external electronic device 210, and output the processed information via the output device of the electronic device 101. The processor 300 may process information (e.g., touch input information) on the application program, which is acquired via the input device of the electronic device 101, and output the processed information via the output device of the electronic device 101. The processor 300 may control the communication circuit 310 to transmit, to the first external electronic device 210, the information on the application program, which is acquired via the input device of the electronic device 101, or a processing result of the information on the application program. According to an embodiment, the operations of the electronic device 101 in operations 1001 to 1005 of FIG. 10 may include the operations of the electronic device 101 in operations 211 to 231 of FIG. 2.

According to various embodiments, in operation 1007, the electronic device (e.g., the processor 120 or 300) may identify whether a call transfer event related to the call associated with the first external electronic device 210 is sensed. As an example, the call transfer event may occur based on at least one of an input related to a call transfer, reception of a signal related to a call transfer, or acquisition of motion information related to a call transfer.

According to various embodiments, if occurrence of the call transfer event related to the call associated with the first external electronic device 210 is not sensed (e.g., “No” in operation 1007), the electronic device (e.g., the processor 120 or 300) may terminate an embodiment for transferring of the call associated with the first external electronic device to a second external electronic device. According to an embodiment, the processor 300 may control the communication circuit 310 to maintain the call connection of the electronic device 101 and the first external electronic device 210, and sharing of the application program.

According to various embodiments, if occurrence of the call transfer event related to the call associated with the first external electronic device 210 is sensed (e.g., “Yes” in operation 1007), the electronic device (e.g., the processor 120 or 300) may store, in operation 1009, the state information on the application program shared with the first external electronic device 210. According to an embodiment, when the occurrence of the call transfer event is sensed, the processor 300 may store, in the memory 320, the state information on the application program via a first control command (e.g., savestate( ) API) related to the application program shared with the first external electronic device 210. For example, the state information on the application program may be stored in the form of <key, value> based on identification information (e.g., a phone number) of the first external electronic device 210 connected to the electronic device 101 via the call. As an example, the key may represent the identification information (e.g., a phone number) of the first external electronic device 210. As an example, the value may represent information on a current state (or current driving state) of the application program.

According to various embodiments, in operation 1011, the electronic device (e.g., the processor 120 or 300) may transmit, to the second external electronic device, information on the call associated with the first external electronic device 210. For example, the processor 300 may control the communication circuit 310 to relay the call between the first external electronic device 210 and the second external electronic device. According to an embodiment, the processor 300 may control the communication circuit 310 to transmit call information (e.g., voice and/or video) received from the first external electronic device 210 to the second external electronic device in a state where the call is connected to the first external electronic device 210. For example, an output of the electronic device 101 for the call information received from the first external electronic device 210 may be limited based on transferring of the call associated with the first external electronic device 210. According to an embodiment, the processor 300 may control the communication circuit 310 to transmit the call information (e.g., voice and/or video) received from the second external electronic device to the first external electronic device 210. For example, an output of the electronic device 101 for the call information received from the second external electronic device may be limited based on transferring of the call associated with the first external electronic device 210.

According to various embodiments, in operation 1013, the electronic device (e.g., the processor 120 or 300) may transmit state information on the application program shared with the first external electronic device 210 to the second external electronic device. According to an embodiment, the processor 300 may control the communication circuit 310 to transmit the application program, the state information on the application program, and state information of the electronic device 101 to the second external electronic device via the data channel with respect to the second external electronic device. For example, the state information of the electronic device 101 may include information on a resolution of a touch area of the electronic device 101. According to an embodiment, when the information on the application program is received from the first external electronic device 210 while the data channel with respect to the first external electronic device 210 is established, the processor 300 may control the communication circuit 310 to transmit the information on the application program, which is received from the first external electronic device 210, to the second external electronic device.

According to various embodiments, in operation 1015, the electronic device (e.g., the processor 120 or 300) may identify whether information on a touch event is received from the second external electronic device.

According to various embodiments, if information on the touch event is not received from the second external electronic device (e.g., "No" in operation 1015), the electronic device (e.g., the processor 120 or 300) may terminate an embodiment for sharing of the application program.

According to various embodiments, if the information on the touch event is received from the second external electronic device (e.g., "Yes" in operation 1015), the electronic device (e.g., the processor 120 or 300) may process the information on the touch event, which is received from the second external electronic device, in operation 1017. According to an embodiment, the processor 300 may control driving of the application program, based on the touch information on the application program, which is received from the second external electronic device. The processor 300 may control the communication circuit 310 to transmit information on driving of the application program to the first external electronic device 210. For example, the touch information on the application program, which is received from the second external electronic device, may include touch information converted based on the resolution (e.g., the resolution of the touch area) of the electronic device 101.

According to various embodiments, the electronic device 101 may transmit the information on the application program, which is received from the second external electronic device, to the first external electronic device 210. According to an embodiment, the processor 300 may control the communication circuit 310 to transmit the information on the application program, which is received from the second external electronic device, to the first external electronic device 210 without separately processing the same.

Figure 11:
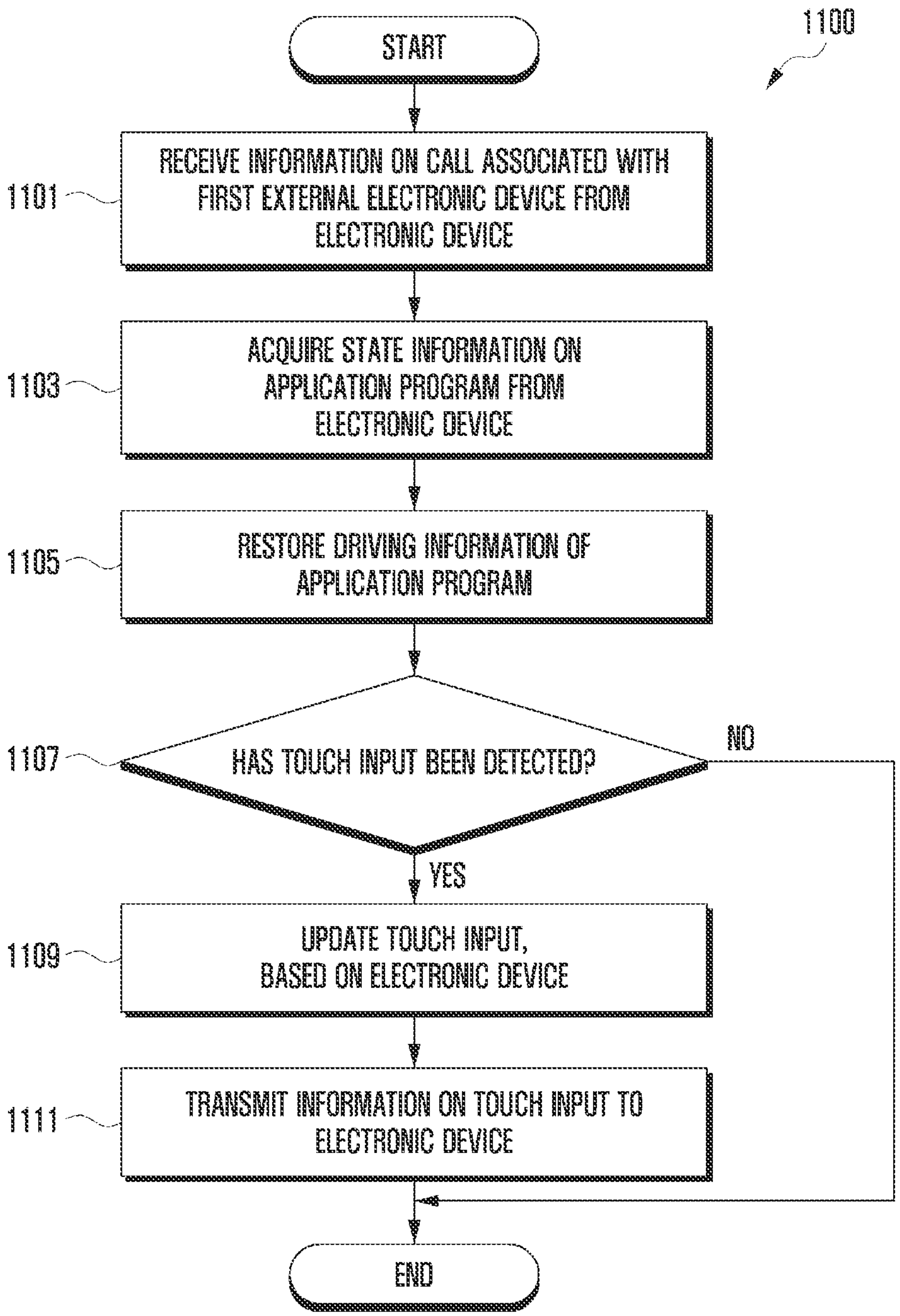
FIG. 11 is a flowchart for providing an interactive calling function associated with a first external electronic device in a second external electronic device according to an embodiment of the disclosure.

FIG. 11 is a flowchart for providing an interactive calling function associated with a first external electronic device in a second external electronic device according to an embodiment of the disclosure. In the following embodiments, respective operations may be sequentially performed, but are not necessarily performed sequentially. For example, the order of respective operations may be changed, and at least two operations may be performed in parallel. As an example, the second external electronic device of FIG. 11 may be the electronic device 101 of FIG. 1 or 3.

Referring to FIG. 11, flowchart 1100 illustrates that, in operation 1101, the second external electronic device (e.g., the processor 120 of FIG. 1 or the processor 300 of FIG. 3) may receive information on a call associated with the first external electronic device 210 from the electronic device 101. According to an embodiment, the second external electronic device (e.g., the processor 300) may establish a data channel with respect to the electronic device 101, based on information on a request for establishment of a data channel, which is received from the electronic device 101. The second external electronic device (e.g., the processor 300) may acquire call information (e.g., voice and/or video) received from the first external electronic device 210 via the data channel with respect to the electronic device 101. The second external electronic device (e.g., the processor 300) may output the call information received from the first external electronic device 210, via an output device (e.g., an audio output device and/or a display) of the second external electronic device. According to an embodiment, the second external electronic device (e.g., the processor 300) may transmit call information collected via an input device (e.g., an audio input device and/or a camera) of the second external electronic device to the first external electronic device 210 via the electric device 101.

According to various embodiments, in operation 1103, the second external electronic device (e.g., the processor 120 or 300) may receive an application program shared with the first external electronic device 210 and state information on the application program from the electronic device 101.

According to various embodiments, in operation 1105, the second external electronic device (e.g., the processor 120 or 300) may restore a driving state of the application program shared by the electronic device 101 and the first external electronic device 210. According to an embodiment, the second external electronic device (e.g., the processor 300) may acquire the state information on the application program, which is related to the first external electronic device 210, via a second control command (e.g., restorestate( ) API) related to the application program. The second external electronic device (e.g., the processor 300) may restore the driving state of the application program shared by the electronic device 101 and the first external electronic device 210, based on the state information on the application program, which is related to the first external electronic device 210.

According to various embodiments, in operation 1107, the second external electronic device (e.g., the processor 120 or 300) may identify whether a touch input (or user input) related to the application program is detected (or received). For example, the touch input related to the application program may include a touch input corresponding to output information of the application program, which is displayed on a display of the second external electronic device.

According to various embodiments, if the touch input (or user input) related to the application program is not detected (or not received) (e.g., "No" in operation 1107), the second external electronic device (e.g., the processor 120 or 300) may terminate an embodiment for providing an interactive calling function associated with the first external electronic device.

According to various embodiments, if the touch input (or user input) related to the application program is detected (or received) (e.g., "Yes" in operation 1107), the second external electronic device (e.g., the processor 120 or 300) may update the touch input based on a resolution (e.g., a resolution of a touch area) of the electronic device 101, in operation 1109. For example, the updating of the touch input may include a series of operations for converting touch coordinates detected via the second external electronic device to correspond to the electronic device 101, based on a difference between resolutions (e.g., resolutions of touch areas) of the second external electronic device and the electronic device 101.

According to various embodiments, in operation 1111, the second external electronic device (e.g., the processor 120 or 300) may transmit, to the electronic device 101, information on the touch input updated based on the resolution (e.g., the resolution of the touch area) of the electronic device 101. According to an embodiment, the electronic device 101 may control driving of the application program shared with the first external electronic device 210, based on the information on the touch input, which is acquired from the second external electronic device. The electronic device 101 may transmit the information on driving of the application program to the first external electronic device 210.

According to various embodiments, the second external electronic device may process the touch input (e.g., user input) related to the application program. According to an embodiment, the second external electronic device may control driving of the application program, based on the touch input related to the application program. The second external electronic device may transmit the information on driving of the application program to the first external electronic device 210 via the electronic device 101.

Figure 12:
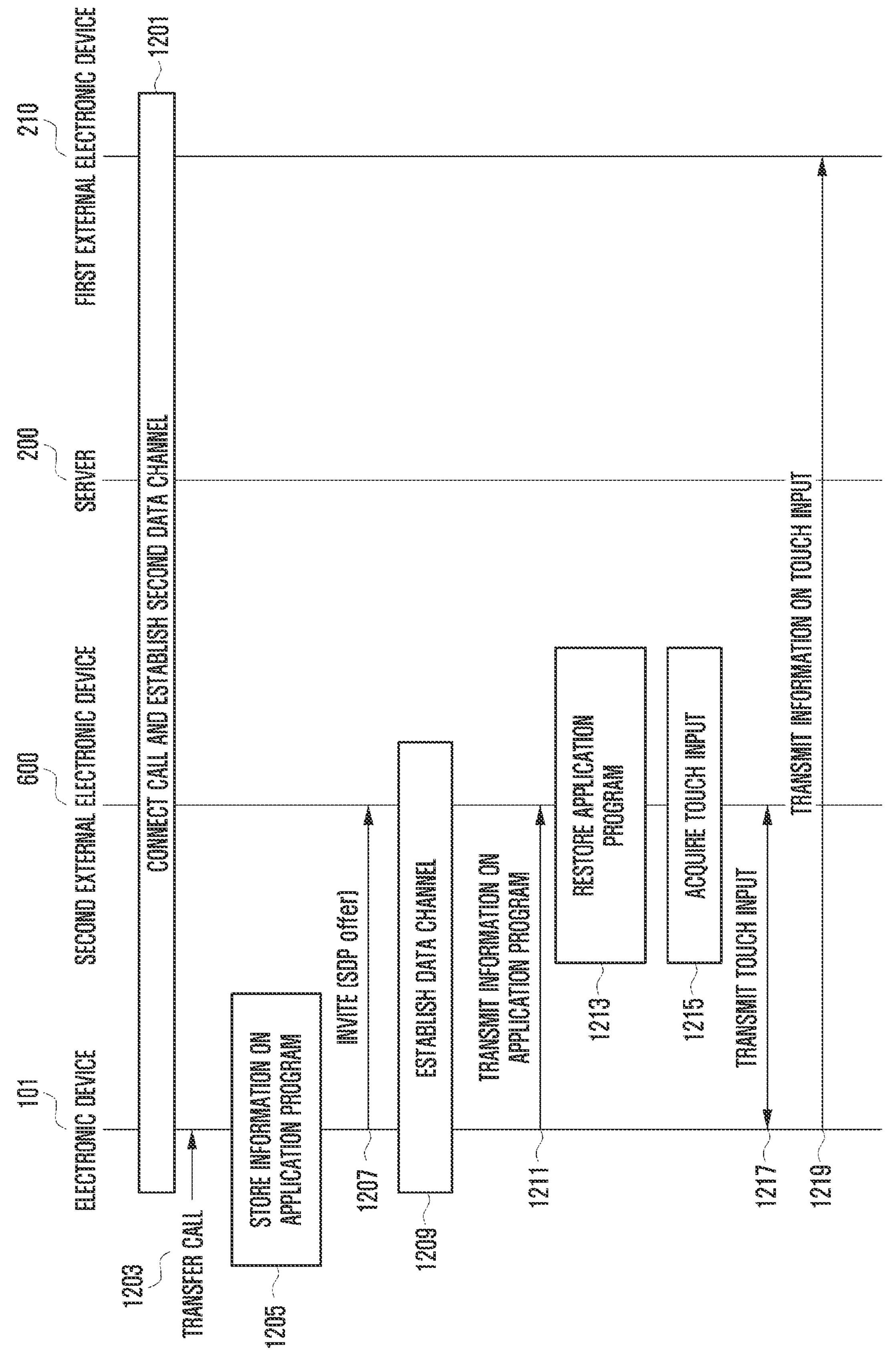
FIG. 12 is an example for transferring a call associated with a first external electronic device to a second external electronic device by an electronic device according to an embodiment of the disclosure.

FIG. 12 is an example for transferring a call associated with a first external electronic device to a second external electronic device by the electronic device according to an embodiment of the disclosure.

Referring to FIG. 12, in operation 1201, the electronic device 101 may connect a call to the first external electronic device 210 and establish a second data channel. According to an embodiment, based on operation 211 to operation 231 of FIG. 2, the electronic device 101 may connect the call to the first external electronic device 210 and establish the second data channel for sharing an application program. According to an embodiment, the electronic device 101 and the first external electronic device 210 may transmit and/or receive information (or data) on the application program via the second data channel. For example, the second data channel may include an IMS data channel established for direct communication (e.g., P2P) between the electronic device 101 and the first external electronic device 210.

According to various embodiments, in operation 1203, the electronic device 101 may identify whether a call transfer event associated with the first external electronic device 210 occurs. As an example, the call transfer event may occur based on at least one of an input related to a call transfer, reception of a signal related to a call transfer, or acquisition of motion information related to a call transfer.

According to various embodiments, when occurrence of the call transfer event related to the first external electronic device 210 is sensed in operation 1203, the electronic device 101 may store state information on the application program shared with the first external electronic device 210, in operation 1205. For example, the state information on the application program may be stored in the form of <key, value> based on identification information (e.g., a phone number) of the first external electronic device 210 connected to the electronic device 101 via the call. As an example, the key may represent the identification information (e.g., a phone number) of the first external electronic device 210. As an example, the value may represent information on a current state (or current driving state) of the application program.

According to various embodiments, in operation 1207, the electronic device 101 may transmit information (e.g., an invite message) on the call associated with the first external electronic device 210 to the second external electronic device 600. For example, the information on the call associated with the first external electronic device 210 may include request information related to establishment of a data channel to the second external electronic device 600. According to an embodiment, the second external electronic device 600 may output the call information received from the first external electronic device 210, via an output device (e.g., an audio output device and/or a display) of the second external electronic device 600. According to an embodiment, the second external electronic device 600 may transmit call information collected via an input device (e.g., an audio input device and/or a camera) of the second external electronic device 600 to the first external electronic device 210 via the electric device 101.

According to various embodiments, in operation 1209, for the electronic device 101 and the second external electronic device 600, a data channel may be established based on the request information on establishment of the data channel.

According to various embodiments, in operation 1211, the electronic device 101 may transmit the state information on the application program shared with the first external electronic device 210 to the second external electronic device 600 via the data channel with respect to the second external electronic device 600. According to an embodiment, the electronic device 101 may transmit the application program, the state information on the application program, and state information of the electronic device 101 to the second external electronic device 600 via the data channel with respect to the second external electronic device 600. For example, the state information of the electronic device 101 may include information on a resolution of a touch area of the electronic device 101.

According to various embodiments, in operation 1213, the second external electronic device 600 may restore the state information of the application program shared by the electronic device 101 and the first external electronic device 210, based on the application program and the state information on the application program, which are received from the electronic device 101. According to an embodiment, the second external electronic device 600 may acquire the state information on the application program, which is related to the first external electronic device 210, via a second control command (e.g., restorestate( ) API) related to the application program. The second external electronic device 600 may restore the state information of the application program shared by the electronic device 101 and the first external electronic device 210, based on the state information on the application program, which is related to the first external electronic device 210.

According to various embodiments, in operation 1215, the second external electronic device 600 may detect a touch input (e.g., user input) related to the application program. For example, the touch input related to the application program may include a touch input corresponding to output information of the application program, which is displayed on a display of the second external electronic device 600.

According to various embodiments, in operation 1217, the second external electronic device 600 may transmit the touch input related to the application program to the electronic device 101. According to an embodiment, the second external electronic device 600 may update the touch input related to the application program, based on the resolution (e.g., the resolution of the touch area) of the electronic device 101. The second external electronic device 600 may transmit, to the electronic device 101, the touch input related to the application program, which has been updated based on the resolution (e.g., the resolution of the touch area) of the electronic device 101. For example, the updating of the touch input may include a series of operations for converting touch coordinates detected via the second external electronic device 600 to correspond to the electronic device 101, based on a difference between resolutions (e.g., resolutions of touch areas) of the second external electronic device 600 and the electronic device 101.

According to various embodiments, the electronic device 101 may process the touch input related to the application program, which is received from the second external electronic device 600. According to an embodiment, the electronic device 101 may control driving of the application program, based on the touch input related to the application program, which is received from the second external electronic device 600. According to an embodiment, in operation 1219, the electronic device 101 may transmit information on driving of the application program to the first external electronic device 210.

According to various embodiments, an operation method of an electronic device (e.g., the electronic device 101 of FIG. 1, 2, or 3) may include connecting a call to a first external electronic device (e.g., the first external electronic device 210 of FIG. 2, 6, 9, or 12) via a server (e.g., the server 200 of FIG. 2, 6, 9, or 12). According to an embodiment, the operation method of the electronic device may include transmitting and/or receiving data related to an application program to and/or from the first external electronic device via direct communication with the first external electronic device. According to an embodiment, the operation method of the electronic device may include storing state information on the application program, based on occurrence of an event related to transferring of the call connection from the first external electronic device to the second external electronic device. According to an embodiment, the operation method of the electronic device may include transmitting the state information on the application program to a second external electronic device (e.g., the second external electronic device 600 of FIG. 6, 9, or 12) via direct communication with the second external electronic device. According to an embodiment, the operation method of the electronic device may include transmitting, to the server, information on transferring of the call connection to the second external electronic device.

According to various embodiments, the operation method of the electronic device may include, based on occurrence of an event related to transferring of the call connection with the first external electronic device, transmitting, to the first external electronic device via the server, the information on transferring of the call connection.

According to various embodiments, the operation method of the electronic device may include terminating driving of the application program, based on transmission of the information on transferring of the call connection.

According to various embodiments, the operation method of the electronic device may include acquiring the application program from the server in a state where the call is connected to the first external electronic device, and establishing a data channel related to the application program with respect to the first external electronic device.

According to various embodiments, the transmitting and/or receiving the data may include transmitting and/or receiving the data related to the application program to and/or from the first external electronic device via the data channel established with respect to the first external electronic device.

According to various embodiments, the state information on the application program may include at least one of identification information of the first external electronic device or information on a current driving state of the application program.

According to various embodiments, the operation method of the electronic device may include releasing the call connection with the first external electronic device, based on a response signal for the information on transferring of the call connection to the second external electronic device.

According to various embodiments, the operation method of the electronic device may include releasing the call connection with the second external electronic device, based on a response signal for the information on transferring of the call connection to the second external electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless electronic device comprising:
a communication circuit;
memory, comprising one or more storage media, storing instructions; and
one or more processors communicatively coupled to the communication circuit and the memory,
wherein the instructions, when executed by the one or more processors individually or collectively, cause the electronic device to:
connect, via a server using the communication circuit, a call with a first external electronic device,
establish, via the server, a first data channel between the wireless electronic device and the first external electronic device based on the call connected with the first external electronic device, the first data channel being different from the call,
share, with the first external electronic device via the first data channel, data related to an application program while maintaining the call,
based on an occurrence of a call transfer event for establishing a call connection between the first external electronic device and a second external electronic device, transmit, to the first external electronic device via the server, the information on the call transfer event,
terminate execution of the application program in response to transmitting the information,
store execution state information of the application program,
establish a second data channel between the wireless electronic device and the second external electronic device,
transmit, to the second external electronic device via the second data channel, the execution state information of the application program,
transmit, to the server, information on the call transfer event, and
based on receiving, from the server, information on release of the call generated based on the information on the call transfer, release the call between the wireless electronic device and the first external electronic device.

2. The wireless electronic device of claim 1, wherein the instructions, when executed by the one or more processors individually or collectively, further cause the electronic device to:
in a state in which the call is connected to the first external electronic device, acquire the application program from the server.

3. The wireless electronic device of claim 2, wherein the instructions, when executed by the one or more processors individually or collectively, further cause the electronic device to:
based on a real-time communication (RTC) function in a state in which the call is connected to the first external electronic device, download the application program from the server.

4. The wireless electronic device of claim 1, wherein the execution state information of the application program includes at least one of identification information of the first external electronic device or information on a current driving state of the application program.

5. The wireless electronic device of claim 1, wherein the instructions, when executed by the one or more processors individually or collectively, further cause the electronic device to:

based on receiving, from the server, the information on release of the call connection while a call between the wireless electronic device and the second external electronic device is in a holding call state, release the call between the wireless electronic device and the second external electronic device.

6. An operation method of a wireless electronic device, the operation method comprising:

connecting, via a server, a call with a first external electronic device;

establishing, via the server, a first data channel between the wireless electronic device and the first external electronic device based on the call connected with the first external electronic device, the first data channel being different from the call;

sharing, with the first external electronic device via the first data channel, data related to an application program while maintaining the call;

based on an occurrence of a call transfer event for establishing a call connection between the first external electronic device and a second external electronic device, transmitting, to the first external electronic device via the server, the information on the call transfer event;

terminating execution of the application program in response to transmitting the information;

storing execution state information of the application program;

establishing a second data channel between the wireless electronic device and the second external electronic device;

transmitting, to the second external electronic device via the second data channel, the execution state information of the application program;

transmitting, to the server, information on the call transfer event; and based on receiving, from the server, information on release of the call generated based on the information on the call transfer, releasing the call between the wireless electronic device and the first external electronic device.

7. The method of claim 6, further comprising:

in a state in which the call is connected to the first external electronic device, acquiring the application program from the server.

8. The method of claim 7, further comprising:

based on a real-time communication (RTC) function in a state in which the call is connected to the first external electronic device, downloading the application program from the server.

9. The method of claim 7, wherein the first data channel includes an Internet protocol (IP) multimedia subsystem (IMS) data channel.

10. The method of claim 6, further comprising:

based on receiving, from the server, the information on release of the call while a call between the wireless electronic device and the second external electronic device is in a holding call state, releasing the call between the wireless electronic device and the second external electronic device.

11. The method of claim 6, wherein the execution state information of the application program includes at least one of identification information of the first external electronic device or information on a current driving state of the application program.

12. The method of claim 6, wherein the call transfer event occurs based on at least one of an input related to a call transfer, reception of a signal related to the call transfer, or acquisition of motion information related to the call transfer.

* * * * *